US008548253B2

(12) United States Patent
Besley

(10) Patent No.: US 8,548,253 B2
(45) Date of Patent: Oct. 1, 2013

(54) FAST LINE LINKING

(75) Inventor: James Austin Besley, Killara (AU)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 12/885,041

(22) Filed: Sep. 17, 2010

(65) Prior Publication Data

US 2011/0069890 A1    Mar. 24, 2011

(30) Foreign Application Priority Data

Sep. 22, 2009   (AU) ................................. 2009217445

(51) Int. Cl.
*G06K 9/46*   (2006.01)
*G06K 9/48*   (2006.01)

(52) U.S. Cl.
USPC ........................................ 382/203; 382/199

(58) Field of Classification Search
USPC ........................................ 382/103, 199, 203
See application file for complete search history.

(56) References Cited

U.S. PATENT DOCUMENTS

| | | | | |
|---|---|---|---|---|
| 4,183,013 A * | 1/1980 | Agrawala et al. | ............. | 382/173 |
| 5,251,268 A * | 10/1993 | Colley et al. | ................. | 382/156 |
| 6,052,480 A | 4/2000 | Yabuki et al. | | |
| 6,529,635 B1 * | 3/2003 | Corwin et al. | ................ | 382/243 |
| 7,324,691 B2 * | 1/2008 | Li et al. | ......................... | 382/181 |
| 7,576,753 B2 * | 8/2009 | Saund et al. | ................. | 345/619 |
| 7,672,507 B2 * | 3/2010 | Fan | .............................. | 382/164 |

* cited by examiner

*Primary Examiner* — Daniel Mariam
(74) *Attorney, Agent, or Firm* — Fitzpatrick, Cella, Harper & Scinto

(57) ABSTRACT

Disclosed is a computer implemented method (200) of processing a bitmap image (110) including at least one shape defined by at least one line (113-115). The method processes the image to form a plurality of boundaries, each boundary representing an enclosed path (410-424). The boundaries also define at least one enclosed region (425-429) representing a graphical object. Line elements are detected (310) together with associated regions (430-465) in the graphical object. The method determines line statistics (325) corresponding to at least one of the boundaries of the object based on the detected line elements and performs shape recognition (1010) on at least one of the boundaries based on said line statistics. The method recognizes (1020,1045) at least one part of the object as a shape and stores a description of the shape.

14 Claims, 29 Drawing Sheets

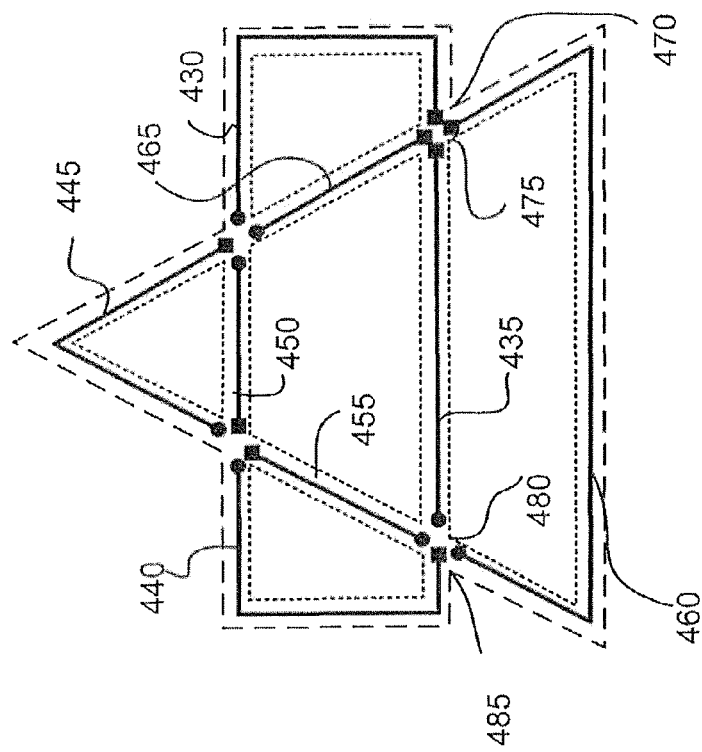
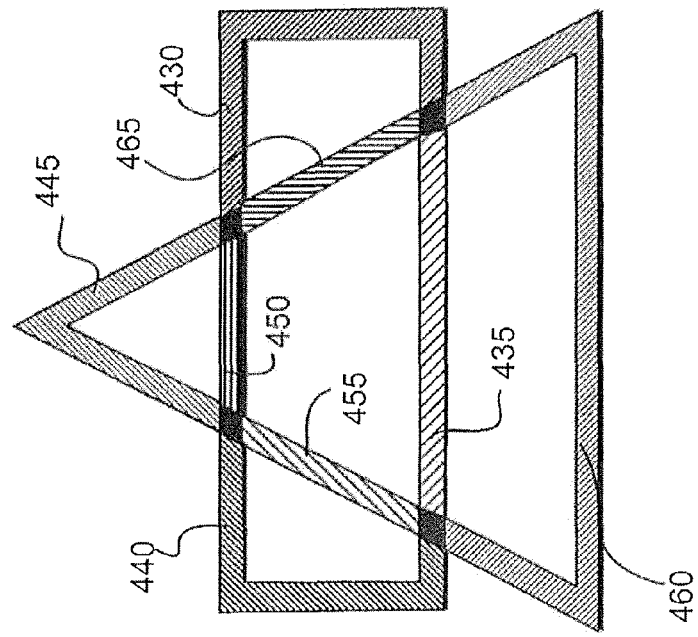
Fig. 4(d)
Fig. 4(c)

FAST LINE LINKING

REFERENCE TO RELATED PATENT APPLICATION

This application claims the benefit under 35 U.S.C. §119 of the filing date of Australian Patent Application No. 2009217445, filed Sep. 22, 2009, hereby incorporated by reference in its entirety as if fully set forth herein.

TECHNICAL FIELD

The current invention relates generally to the processing of images and, in particular, to the analysis of image objects to detect intersecting or adjacent lines and shapes. The present invention also relates to a computer program product including a computer readable medium having recorded thereon a computer program for processing the objects.

BACKGROUND

The proliferation of imaging technology, combined with ever increasing computational processing power, has lead to many advances in the area of automated document analysis. A significant proportion of office documents are generated using structured text/graphics editing applications such as Microsoft™ Word™, Microsoft™ Powerpoint™, amongst many others. In addition to formatted text editing, these text/graphics editing applications include basic drawing tools and options for the drawing of graphics shapes and the like. An important class of document analysis applications are referred to as "scan-to-editable" applications. These applications process a scanned bitmap representation of a document to generate an electronic version of the document that can be viewed and edited using such editing applications.

Drawing options in a typical structured text/graphics editing application include freeform line drawing, template shapes and connectors (i.e., dynamic line objects that connect to and/or between template shapes within a document). Some shapes and lines have one or more control points that permit user modification of the shape or line through manipulation of the control point(s) on a graphical user interface. The text/graphics editing applications may also include coloring, filling, layering and grouping options for sets of objects. Many commonly used geometric shapes can be created using template shapes. A user may prefer to use a template shape rather than drawing the shape using freeform lines as this option can be faster, more accurate in terms of representation of the desired shape, and easier to edit at a later time. The well known Microsoft™ AutoShapes set includes a number of examples of template shapes which can be manipulated within editing environments such as Microsoft™ Word™ and PowerPoint™. Other template shapes may be found in OpenOffice.org™ editing applications such as the Writer™ and Impress™ applications.

Line detection is a vectorisation method used in image processing and, in particular, document scan processing. There are a number of methods used for vectorizing bit-mapped images including thinning methods, distance based methods, contour matching methods and Sparse Pixel Vectorization (SPV). Most of these methods require direct processing of pixel data during line detection. Line detection typically occurs at an early stage of processing an image when performing shape/line analysis on the image. Unfortunately, line detection methods frequently fail at sharp corners or curves. Such sharp corners and curves are common features in template shape objects used in "scan-to-editable" document analysis applications. As a result, shape matching can often fail.

SUMMARY

Disclosed is a system by which an image incorporating lines and shapes is processed so that graphics recognition may be performed to identify a shape from the image. The image is processed to identify boundaries, which are then processed to determine line elements. The line elements are assessed to establish statistics to assist in understanding the nature of the boundaries. With the statistics, the identified boundaries are then processed to identify one or more shapes recognizable as graphical objects.

According to one aspect of the present disclosure, there is provided a computer implemented method of processing a bitmap image including at least one shape defined by at least one line, the method comprising:

processing the image to form a plurality of boundaries, each said boundary representing an enclosed path, the plurality of boundaries defining at least one enclosed region representing a graphical object;

detecting line elements and associated regions in the graphical object;

determining line statistics corresponding to at least one of the boundaries of the object based on the detected line elements;

performing shape recognition on at least one of the boundaries based on said line statistics; and recognising at least one part of the object as a shape and storing a description of the shape.

Other aspects are also disclosed.

BRIEF DESCRIPTION OF THE DRAWINGS

At least one embodiment of the present invention will now be described with reference to the following drawings, in which:

FIG. 4(a), FIG. 4(b), FIG. 4(c), FIG. 4(d) and FIG. 4(e) illustrate various aspects of the processing of a graphical object;

DETAILED DESCRIPTION INCLUDING BEST MODE

Figure 1:
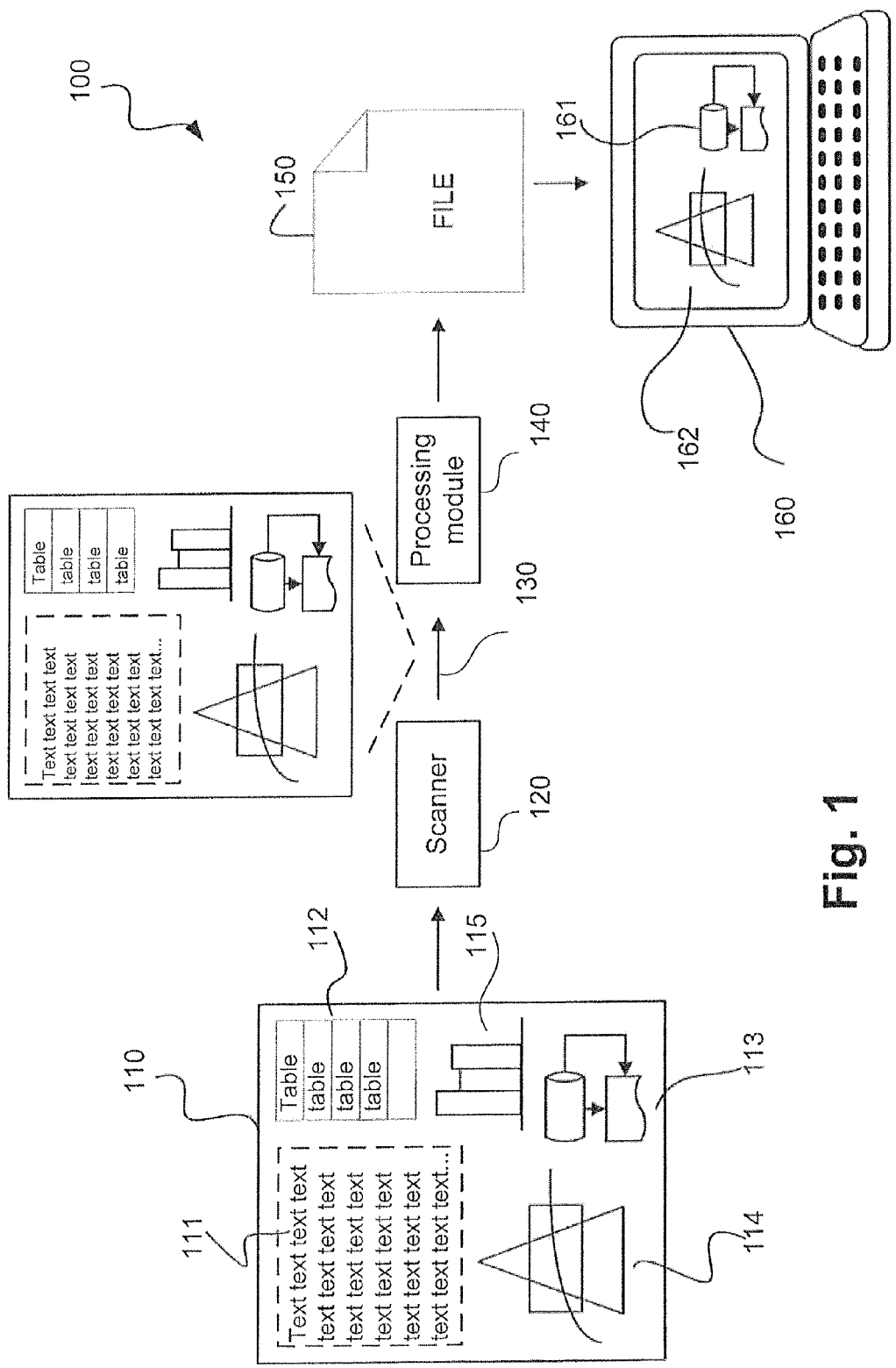
FIG. 1 illustrates a system in which the arrangements to be described can be used.

FIG. 1 illustrates a system 100 in which the image processing to be described can be performed. A hard-copy document 110 is scanned by a scanner 120 to form an input scanned document image 130 that is stored in a computerized memory as a bitmap image. The input scanned document image 130 is then processed according to the present disclosure in a processing module 140. The module 140 may perform one or more of a number of document analysis processing stages including line detection and shape recognition. A file description 150 of the document 110 may be generated that includes image elements in the form of template shapes, connectors and freeform elements with various defined styles such as line styles, fill styles and arrowheads, which may be collectively referred to as "line shapes", being a shape defined by at least one line. A "shape" therefore is something that accords with a predefined template definition. The file 150, which may be processed or reproduced by a computer 160, can include image elements 161 and 162 that are suitable for editing using a structured text/graphics editing application executing on an appropriate device, such as the computer 160. The image elements 161 and 162, by virtue of the file 150 and the processing from which they arose, may be therefore and thereafter treated as graphical objects by the computer 160 and applications that may be executed by the computer 160. The objects may be individual lines, groups of lines, shapes, or something generally equivalent to a clipart object.

The document 110 may be a compound document image with a variety of content types. The content types may include, but are not limited to, shape elements such as flowcharts 113, line and shape drawings 114 and other charts 115, in addition to non-shape elements such as text 111 and tables 112. The document 110 can be produced using a variety of equipment including printers, fax machines, and projectors. The image to be processed is typically a document image and at least includes some synthetic or non-natural image content that may be interpreted as a graphical object. Alternatively, more traditional media such as pen on paper or whiteboard may be used and may be an imperfect representation of an original electronic document. The scanner 120 may be a stand-alone scanner, a handheld scanner or a scanner embedded in larger systems such as a multi-functional printer or copier. The scanner may also be formed by some other imaging device such as a camera. The scanner 120, due to imperfections in operation, may also introduce noise into the input scanned document image 130. Examples of the processing module 140 include a computer, such as the computer 160, and a multi-functional printer. The graphics recognition processing of the image 130 to form the file 150 can occur upon the scanning of the document 110, and by which the file 150 may be output to the computer 160 for storage or subsequent use, or both.

Figure 11A:
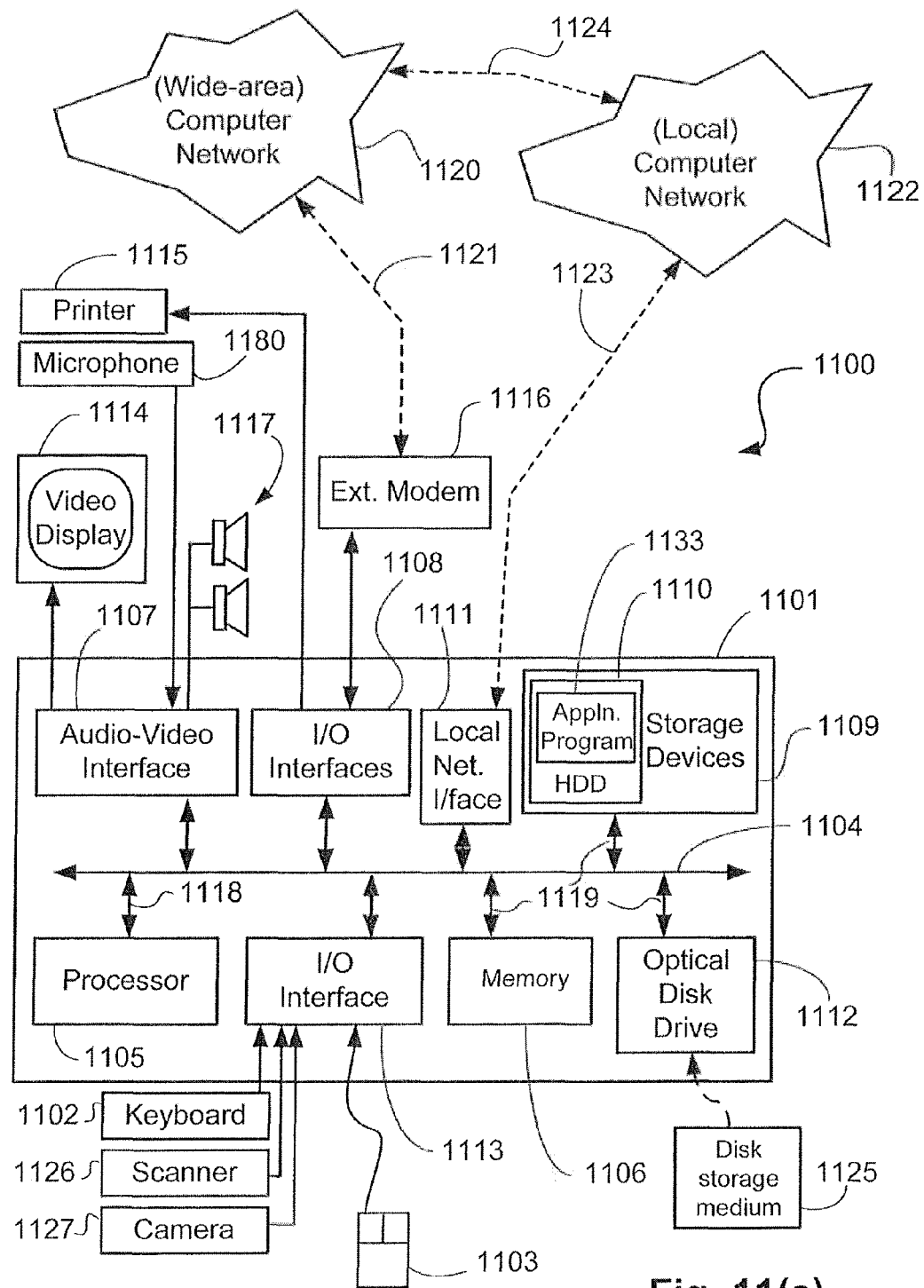
FIG. 11(a) and FIG. 11(b) form a schematic block diagram of a general purpose computer system upon which the system of FIG. 1 can be practiced.
Figure 11B:
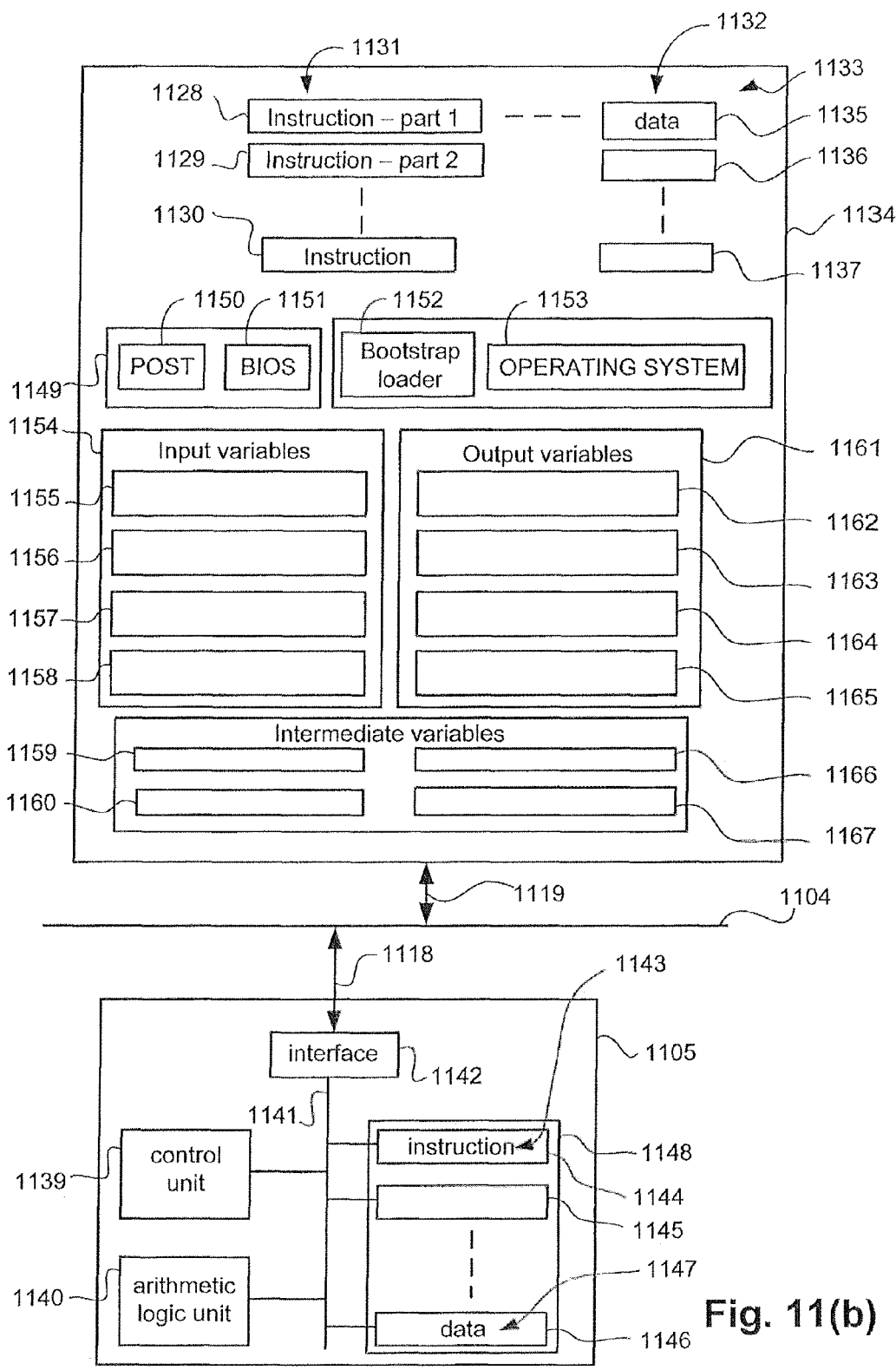

FIGS. 11(a) and 11(b) collectively form a schematic block diagram of a general purpose computer system 1100, with which the system of FIG. 1 and the various arrangements to be described can be practiced.

As seen in FIG. 11(a), the computer system 1100 is formed by a computer module 1101, input devices such as a keyboard 1102, a mouse pointer device 1103, a scanner 1126, a camera 1127, and a microphone 1180, and output devices including a printer 1115, a display device 1114 and loudspeakers 1117. An external Modulator-Demodulator (Modem) transceiver device 1116 may be used by the computer module 1101 for communicating to and from a communications network 1120 via a connection 1121. The network 1120 may be a wide-area network (WAN), such as the Internet or a private WAN. Where the connection 1121 is a telephone line, the modem 1116 may be a traditional "dial-up" modem. Alternatively, where the connection 1121 is a high capacity (eg: cable) connection, the modem 1116 may be a broadband modem. A wireless modem may also be used for wireless connection to the network 1120. Specifically, the processing module 140 and computer 160 of the system 100 of FIG. 1 may be formed or otherwise implemented by the computer module 1101. The memory referred to in the above discussion of FIG. 1 may be implemented by one or both of the memory 1106 or the HDD 1110, or further memory devices to be described.

The computer module 1101 typically includes at least one processor unit 1105, and a memory unit 1106 for example formed from semiconductor random access memory (RAM) and semiconductor read only memory (ROM). The module 1101 also includes an number of input/output (I/O) interfaces including an audio-video interface 1107 that couples to the video display 1114, loudspeakers 1117 and microphone 1180, an I/O interface 1113 for the keyboard 1102, mouse 1103, scanner 1126, camera 1127 and optionally a joystick (not illustrated), and an interface 1108 for the external modem 1116 and printer 1115. In some implementations, the modem 1116 may be incorporated within the computer module 1101, for example within the interface 1108. The computer module 1101 also has a local network interface 1111 which, via a connection 1123, permits coupling of the computer system 1100 to a local computer network 1122, known as a Local Area Network (LAN). As also illustrated, the local network 1122 may also couple to the wide network 1120 via a connection 1124, which would typically include a so-called "firewall" device or device of similar functionality. The interface 1111 may be formed by an Ethernet™ circuit card, a Bluetooth™ wireless arrangement or an IEEE 802.11 wireless arrangement.

The interfaces 1108 and 1113 may afford either or both of serial and parallel connectivity, the former typically being implemented according to the Universal Serial Bus (USB) standards and having corresponding USB connectors (not illustrated). Storage devices 1109 are provided and typically include a hard disk drive (HDD) 1110. Other storage devices such as a floppy disk drive and a magnetic tape drive (not illustrated) may also be used. An optical disk drive 1112 is typically provided to act as a non-volatile source of data. Portable memory devices, such optical disks (eg: CD-ROM, DVD), USB-RAM, and floppy disks for example may then be used as appropriate sources of data to the system 1100.

The components 1105 to 1113 of the computer module 1101 typically communicate via an interconnected bus 1104 and in a manner which results in a conventional mode of operation of the computer system 1100 known to those in the relevant art. Examples of computers on which the described arrangements can be practised include IBM-PC's and compatibles, Sun Sparcstations, Apple Mac™ or alike computer systems evolved therefrom.

The method of image processing may be implemented using the computer system 1100 wherein the processes of FIGS. 2 to 10, and 12 to 26 to be described, may be implemented as one or more software application programs 1133 executable within the computer system 1100. In particular, the steps of the image processing methods are effected by instructions 1131 in the software 1133 that are carried out within the computer system 1100. The software instructions 1131 may be formed as one or more code modules, each for performing one or more particular tasks. The software may also be divided into two separate parts, in which a first part and the corresponding code modules performs the image processing methods and a second part and the corresponding code modules manage a user interface between the first part and the user.

The software 1133 is generally loaded into the computer system 1100 from a computer readable medium, and is then typically stored in the HDD 1110, as illustrated in FIG. 11(*a*), or the memory 1106, after which the software 1133 can be executed by the computer system 1100. In some instances, the application programs 1133 may be supplied to the user encoded on one or more CD-ROM 1125 and read via the corresponding drive 1112 prior to storage in the memory 1110 or 1106. Alternatively the software 1133 may be read by the computer system 1100 from the networks 1120 or 1122 or loaded into the computer system 1100 from other computer readable media. Computer readable storage media refers to any storage medium that participates in providing instructions and/or data to the computer system 1100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 1101. Examples of computer readable transmission media that may also participate in the provision of software, application programs, instructions and/or data to the computer module 1101 include radio or infra-red transmission channels as well as a network connection to another computer or networked device, and the Internet or Intranets including e-mail transmissions and information recorded on Websites and the like.

The second part of the application programs 1133 and the corresponding code modules mentioned above may be executed to implement one or more graphical user interfaces (GUIs) to be rendered or otherwise represented upon the display 1114. Through manipulation of typically the keyboard 1102 and the mouse 1103, a user of the computer system 1100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1117 and user voice commands input via the microphone 1180.

FIG. 11(*b*) is a detailed schematic block diagram of the processor 1105 and a "memory" 1134. The memory 1134 represents a logical aggregation of all the memory devices (including the HDD 1110 and semiconductor memory 1106) that can be accessed by the computer module 1101 in FIG. 11(*a*).

When the computer module 1101 is initially powered up, a power-on self-test (POST) program 1150 executes. The POST program 1150 is typically stored in a ROM 1149 of the semiconductor memory 1106. A program permanently stored in a hardware device such as the ROM 1149 is sometimes referred to as firmware. The POST program 1150 examines hardware within the computer module 1101 to ensure proper functioning, and typically checks the processor 1105, the memory (1109, 1106), and a basic input-output systems software (BIOS) module 1151, also typically stored in the ROM 1149, for correct operation. Once the POST program 1150 has run successfully, the BIOS 1151 activates the hard disk drive 1110. Activation of the hard disk drive 1110 causes a bootstrap loader program 1152 that is resident on the hard disk drive 1110 to execute via the processor 1105. This loads an operating system 1153 into the RAM memory 1106 upon which the operating system 1153 commences operation. The operating system 1153 is a system level application, executable by the processor 1105, to fulfil various high level functions, including processor management, memory management, device management, storage management, software application interface, and generic user interface.

The operating system 1153 manages the memory (1109, 1106) in order to ensure that each process or application running on the computer module 1101 has sufficient memory in which to execute without colliding with memory allocated to another process. Furthermore, the different types of memory available in the system 1100 must be used properly so that each process can run effectively. Accordingly, the aggregated memory 1134 is not intended to illustrate how particular segments of memory are allocated (unless otherwise stated), but rather to provide a general view of the memory accessible by the computer system 1100 and how such is used.

The processor 1105 includes a number of functional modules including a control unit 1139, an arithmetic logic unit (ALU) 1140, and a local or internal memory 1148, sometimes called a cache memory. The cache memory 1148 typically includes a number of storage registers 1144-1146 in a register section. One or more internal buses 1141 functionally interconnect these functional modules. The processor 1105 typically also has one or more interfaces 1142 for communicating with external devices via the system bus 1104, using a connection 1118.

The application program 1133 includes a sequence of instructions 1131 that may include conditional branch and loop instructions. The program 1133 may also include data 1132 which is used in execution of the program 1133. The instructions 1131 and the data 1132 are stored in memory locations 1128-1130 and 1135-1137 respectively. Depending upon the relative size of the instructions 1131 and the memory locations 1128-1130, a particular instruction may be stored in a single memory location as depicted by the instruction shown in the memory location 1130. Alternately, an instruction may be segmented into a number of parts each of which is stored in a separate memory location, as depicted by the instruction segments shown in the memory locations 1128-1129.

In general, the processor 1105 is given a set of instructions which are executed therein. The processor 1105 then waits for a subsequent input, to which it reacts to by executing another set of instructions. Each input may be provided from one or more of a number of sources, including data generated by one or more of the input devices 1102, 1103, data received from an external source across one of the networks 1120, 1122, data retrieved from one of the storage devices 1106, 1109 or data retrieved from a storage medium 1125 inserted into the corresponding reader 1112. The execution of a set of the instructions may in some cases result in output of data. Execution may also involve storing data or variables to the memory 1134.

The disclosed image processing arrangements use input variables 1154, that are stored in the memory 1134 in corresponding memory locations 1155-1158. The image processing arrangements produce output variables 1161, that are stored in the memory 1134 in corresponding memory locations 1162-1165. Intermediate variables may be stored in memory locations 1159, 1160, 1166 and 1167.

The register section 1144-1146, the arithmetic logic unit (ALU) 1140, and the control unit 1139 of the processor 1105 work together to perform sequences of micro-operations needed to perform "fetch, decode, and execute" cycles for every instruction in the instruction set making up the program 1133. Each fetch, decode, and execute cycle comprises:

(a) a fetch operation, which fetches or reads an instruction 1131 from a memory location 1128;

(b) a decode operation in which the control unit 1139 determines which instruction has been fetched; and (c) an execute operation in which the control unit 1139 and/or the ALU 1140 execute the instruction.

Thereafter, a further fetch, decode, and execute cycle for the next instruction may be executed. Similarly, a store cycle may be performed by which the control unit 1139 stores or writes a value to a memory location 1132.

Each step or sub-process in the processes of FIGS. 1-10 and 12 to 26 is associated with one or more segments of the program 1133, and is performed by the register section 1144-1147, the ALU 1140, and the control unit 1139 in the processor 1105 working together to perform the fetch, decode, and execute cycles for every instruction in the instruction set for the noted segments of the program 1133.

The method of image processing may alternatively be implemented in dedicated hardware such as one or more integrated circuits performing the functions or sub functions of image processing. Such dedicated hardware may include graphic processors, digital signal processors, or one or more microprocessors and associated memories.

Figure 2:
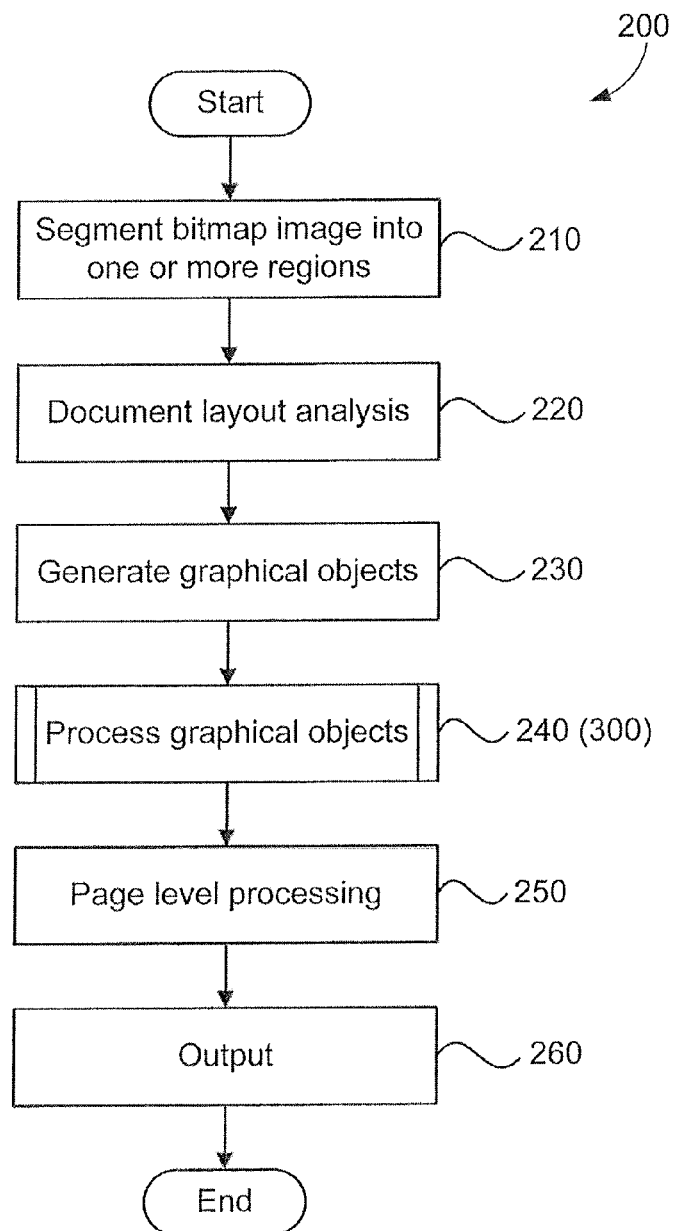
FIG. 2 is a schematic flow diagram of a method for processing a bitmap image of a document according to the present disclosure.

FIG. 2 illustrates a method 200 for processing the bitmap image 130 of the document 110. The method 200 is typically implemented as software stored in the computer 1101 and when executed by the processor 1105 begins in step 210, where a bitmap image, such as the image 130 stored in memory 1134 undergoes image segmentation by the processor 1105 which splits the image into one or more connected components according to color. Each of the connected components of the bitmap image 130 is stored in memory 1134. At the next step 220, the processor 1105 performs document layout analysis on the connected components of the bitmap image 130 to identify various document content types. The connected components may be analysed in terms of rectangular bounding boxes corresponding to individual, merged or grouped connected components from the bitmap image 130. The content types include the following classifications: text, photographs, table, line drawings, and graphics. Each of these content types corresponds to pixel data (i.e., the connected component(s)).

Following document analysis in step 220, the processor 1105 analyses the connected components to generate graphical objects defined by an efficient polygon representation, at step 230. Preferably, only the connected components classified as line drawing and/or graphics are processed, as other classes are considered unlikely to contain line shape content.

Figure 4B:
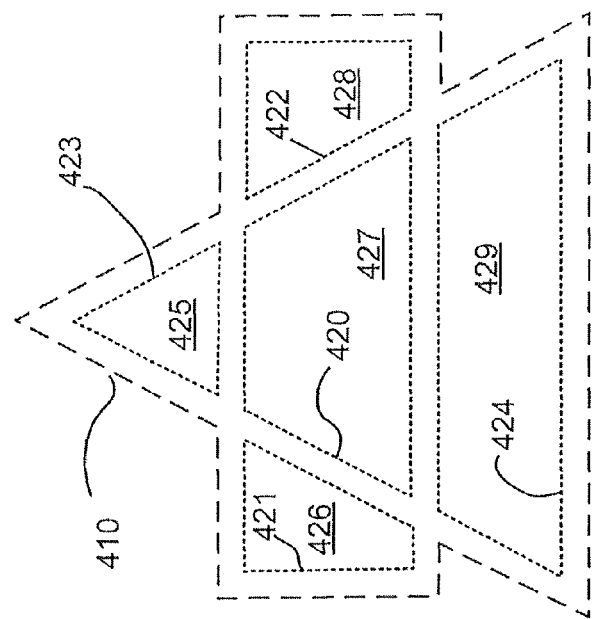
Figure 4A:
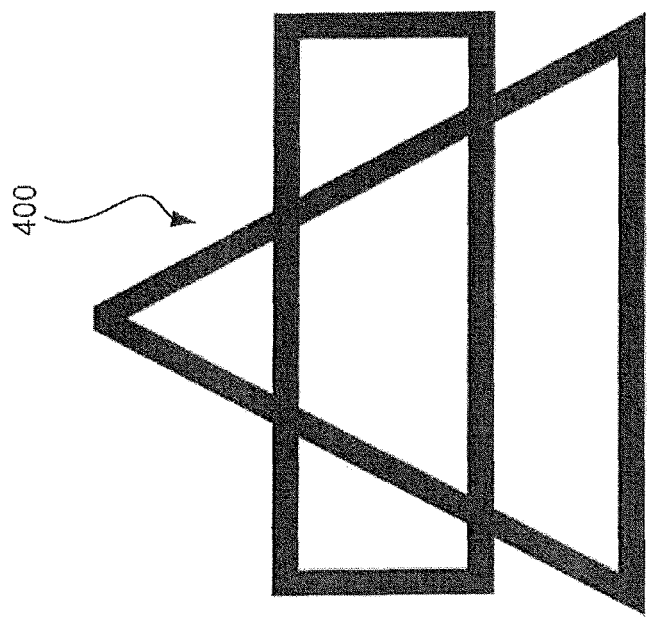
Figure 5B:
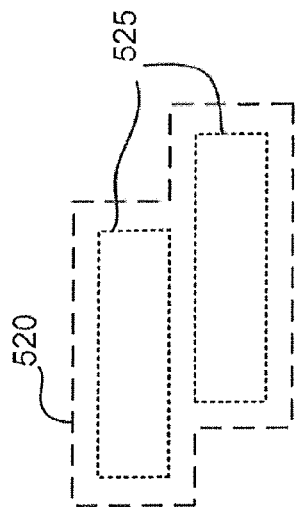
FIG. 5(a), FIG. 5(b), FIG. 5(c) and FIG. 5(d) illustrate various aspects of the processing of another graphical object.
Figure 5D:
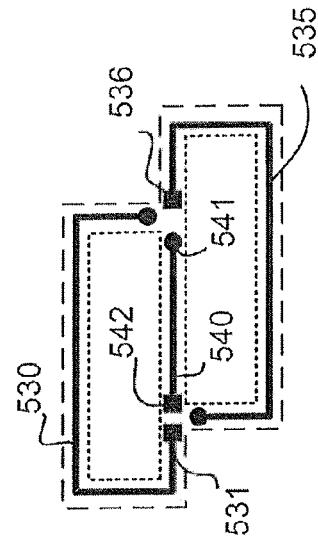
Figure 5A:
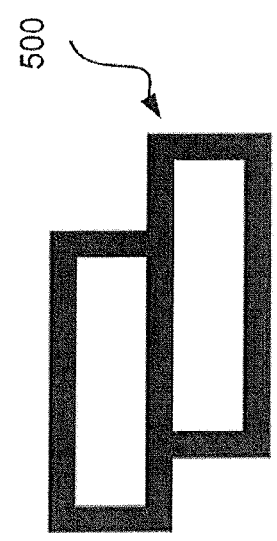

Each graphical object can be defined in terms of a single outer polygon boundary and zero or more inner polygon boundaries corresponding to the single outer contour and a set of zero or more inner contours of a connected component. FIG. 4a illustrates a graphical object that corresponds to a connected component representing two overlapping shapes, a triangle and a rectangle. The corresponding single outer boundary 410 and the five inner boundaries 420 to 424 are shown in FIG. 4(b). The inner boundaries 420-424 define five enclosed regions 425-429. FIG. 5(a) illustrates a graphical object that corresponds to a connected component that represents two adjacent rectangles. The corresponding single outer boundary 520 and the two inner boundaries 525 are shown in FIG. 5(b).

Techniques exist that generate polygon representations for a given contour set such that they are an efficient representation with no self or cross intersections. The points on the boundaries are stored in memory 1134 in a suitable data structure that allows the boundaries to be indexed and traversed. It is advantageous to use a consistent ordering scheme for successive points on the boundaries. In one implementation, the outer boundaries form clockwise loops when traversed in the forward direction while the inner boundaries form anti-clockwise loops. In this configuration the graphical object is on the right side of the boundary when traversing any boundary in the forwards direction.

At the next step 240 in FIG. 2, the graphical objects generated in step 230 are processed to detect template shape objects, line objects, arrowheads and other objects and then decomposed according to the recognised parts. This processing of step 240 essentially refines the graphical objects generated in step 230 to generate component graphical objects that may be subject, as desired, to more refined application. The processing of step 240 is desirably performed in accordance with a method 300 which will be described in more detail below with reference to FIG. 3. The method 200 continues at the next step 250, which optionally performs further processing of the current set of graphical objects as may be present on the document page 110. This processing may employ known techniques for overlapping shape detection, line linking analysis, and connector analysis. Finally, at step 260, the processor 1105 outputs classified objects, and then the processing of method 200 ends. The output may be in a suitable format for viewing and editing in a structured text/graphics editing application.

Figure 3:
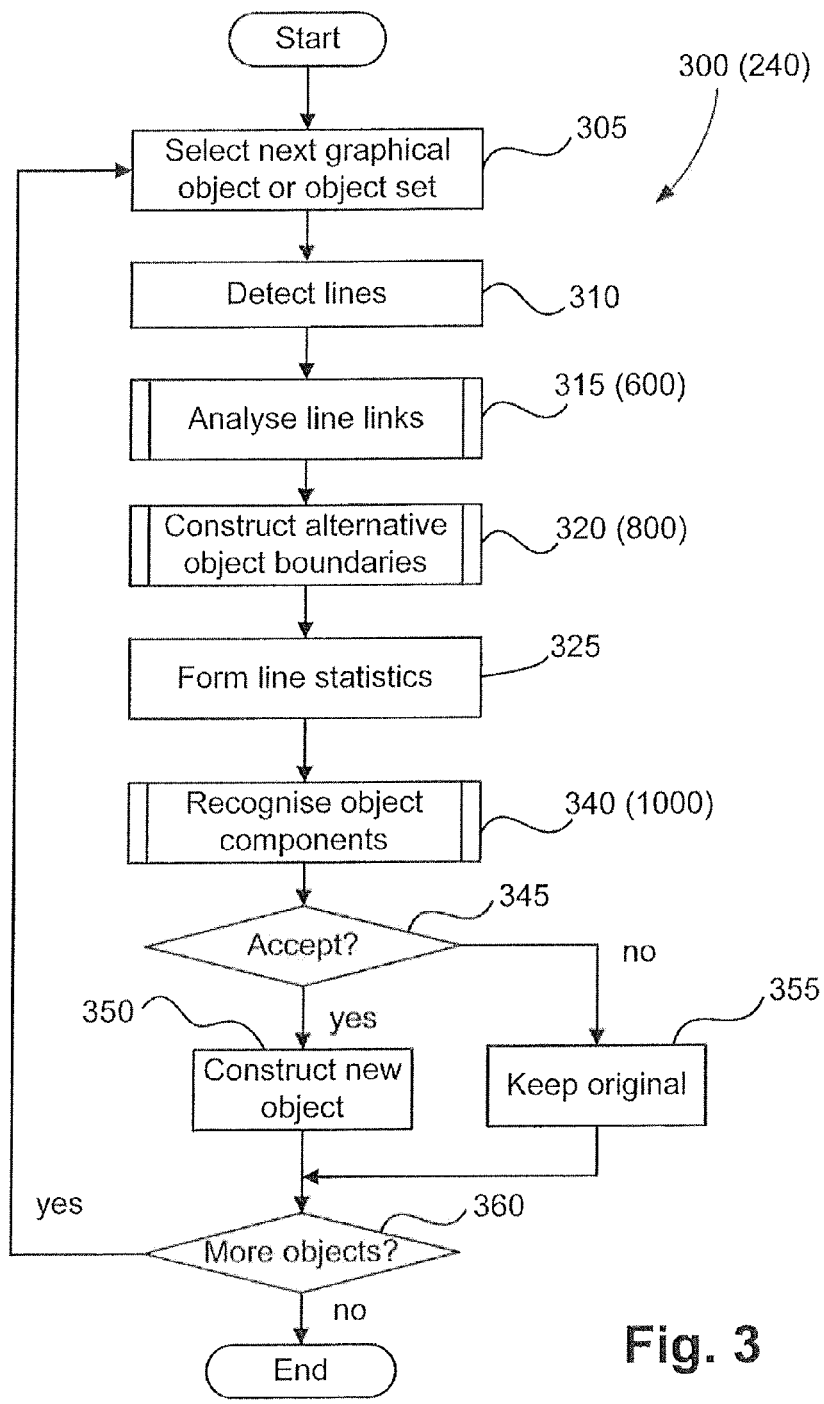
FIG. 3 is a schematic flow diagram of a method of analysing the graphical objects to detect template shape objects, line objects, arrowheads and other objects and decompose them according to their recognised parts, as used in step 240 of FIG. 2.

FIG. 3 illustrates the method 300 for processing graphical objects useful in step 240. This processing detects recognised parts such as template shapes, lines and arrowheads and then decomposes the graphical objects according to the recognised parts. Again, the method 300 may be implemented in software, stored in the memory 1110 and executable by the processor 1105.

First, at step 305, an unprocessed set of graphical objects generated in step 230 is selected. The set of graphical objects may be a single graphical object, or a group of (component) graphical objects with similar color, properties and location as determined by the document layout analysis step 220. At step 310 the set of graphical objects is processed to generate line elements. Techniques exist that detect line elements in a single graphical object based on the geometry of the graphical object. These techniques can be applied to each graphical object in the set individually to generate a set of line elements corresponding to parts of the graphical objects. Each line element is described by a set of geometric data that may include a line element defined by a path along the left and right side, a skeleton or centre-line, and characteristic width data. The line detection method may be based on a constrained triangulation and the region associated with a line is defined in terms of a set of triangles, and the width data may include a width estimate for each triangle in addition to an overall average width.

FIGS. 4(a) to 4(e) illustrate the set of line elements for the single graphical object 400 shown in FIG. 4(a) formed by an overlapping triangle and rectangle shapes. The outer boundary 410 and the five inner boundaries 420 to 424 for this graphical object 400 are shown in FIG. 4(b). FIGS. 4(c) and 4(d) illustrate eight line elements 430-465 found in the graphical object 400. The line elements 430-465 are interpretable to establish associated regions, represented as the hashed regions in FIG. 4(c), while the solid black regions are not contained in line elements. The skeletons, or centre-lines, for the line elements are represented by the solid lines of FIG. 4(d), each of which has a square arrowhead (or line-end) at one end (referred to as the front) and a circle arrowhead at the other (referred to as the back). The left and right sides of the line elements are along the dashed lines representing graphical object boundaries in FIG. 4(d). For example, the left side of line element 460 starts at point 470 and follows the outer boundary forwards (i.e. in a clockwise sense) to point 485, while the right side starts at point 475 and follows the bottom inner boundary backwards (i.e. in a clockwise sense) to point 480.

Figure 5C:
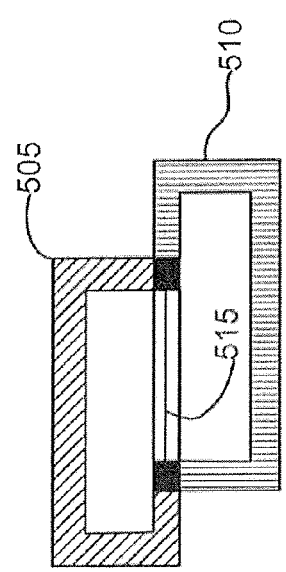

FIGS. 5(a) to 5(d) illustrate the set of line elements for the single graphical object 500 shown in FIG. 5(a) that consists of two adjacent rectangle shapes. The outer boundary 520 and the two inner boundaries 525 for this graphical object 500 are shown in FIG. 5(b). FIG. 5(c) illustrates three line elements 505, 510 and 515 found in the graphical object 500. The regions established by the line elements are represented as the hashed regions in FIG. 5(c), while the solid black regions are not contained in line elements. The line skeletons for the line elements are represented by the solid lines of FIG. 5(d), each of which has a square arrowhead at the front and a circle arrowhead at the back. The left and right sides of the line elements are along the dashed lines representing graphical object boundaries in FIG. 5(d).

Figure 13A:
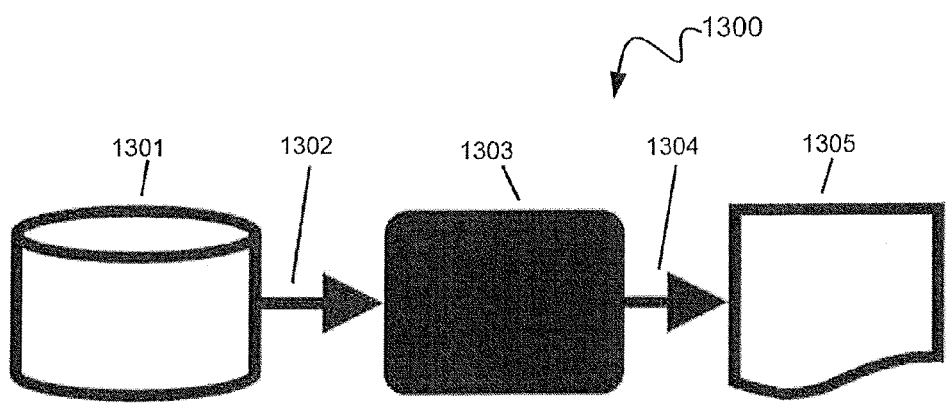
FIG. 13(a), FIG. 13(b), FIG. 13(c), FIG. 13(d), FIG. 13(e) and FIG. 13(f) illustrate various aspects of the processing of a graphical object.
Figure 13B:
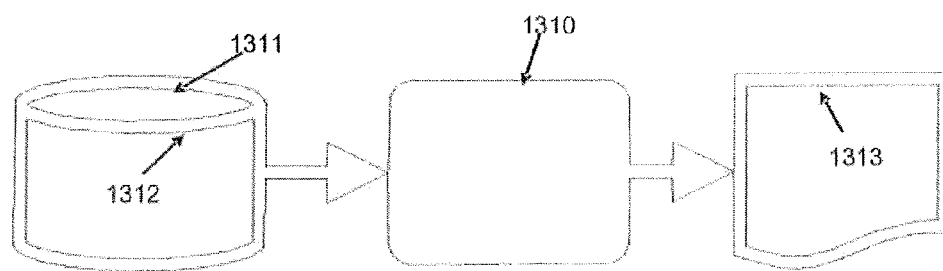
Figure 13C:
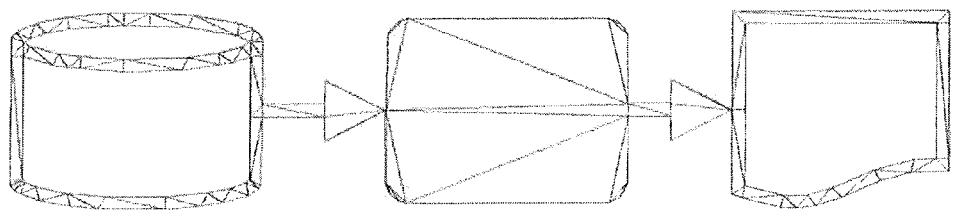

FIG. 13(a) illustrates a single graphical object 1300 comprising 3 shapes 1301, 1303, 1305 connected by two arrowhead connectors 1302 and 1304. The left shape 1301 and the right shape 1305 are line shapes, while the middle shape 1303 is filled. The polygon boundaries of the graphical object 1300 are shown in FIG. 13(b). There is one outer boundary 1310 that surrounds the entire graphical object 1300, and three inner boundaries 1311, 1312 and 1313. A constrained triangulation of the graphical object 1300 is shown in FIG. 13(c), which illustrates triangular regions that may be used in some implementations. The regions 1331-1336 of the object 1300 associated with line elements (1301, 1302, 1304, 1305) are shaded in FIG. 13(d), while those that are not part of a line element, including small regions at the junctions between line elements are not shaded in FIG. 13(d).

Returning to FIG. 3, the line elements detected and generated at step 310 are analysed at step 315 to find a set of links or connections between the line ends. The analysis of step 315 may be performed according to a method 600 that will be described in further detail with respect to FIG. 6. These links may be stored in memory 1134 in a line link table.

Figure 4E:
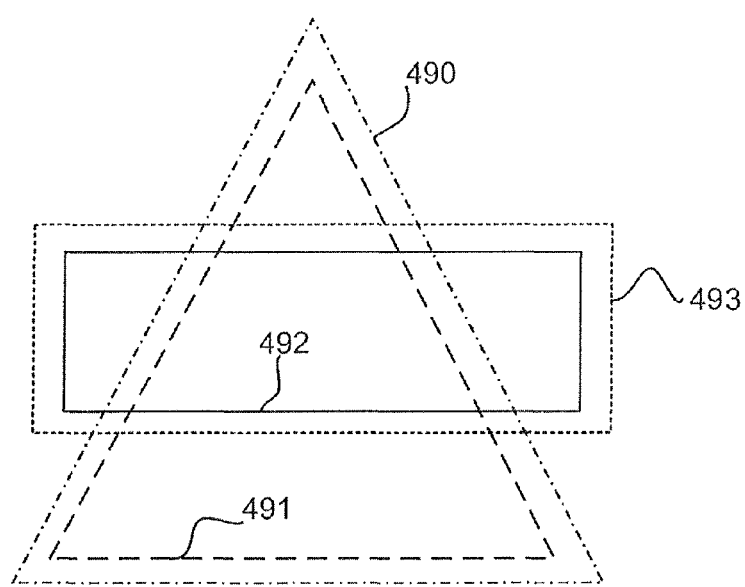

Processing of the method 300 then continues to step 320 which constructs an alternative set of object boundaries based on the set of line links or connections generated in step 315. Step 320 is desirably performed in accordance with method 800 which will be described in detail below with respect to FIG. 8. All points on alternative boundaries are marked as such for later processing. FIG. 4(e) illustrates a set of four alternative boundaries, 490 to 493, that might be constructed for the graphical object 400 represented in FIG. 4(a). It is considered by the present inventors that the boundaries 490-493 better represent the underlying structure of the graphical object 400 because they correspond to the overlapping triangle and rectangle shapes that collectively form the graphical object 400. No alternative boundaries are constructed for the graphical object 500 represented in FIG. 5(a), assuming that the line link table includes links from line ends 531 to 542 and from 541 to 536, or for the graphical object 1300 of FIG. 13(a).

Next, at step 325, line statistic data for the original and alternative boundaries of the graphical object set are determined. Two symmetric table data structures, for example based on associative arrays, are used to store the line statistic data in memory 1134 and these tables are indexed in each of two dimensions according to the boundaries (original and alternative) that describe the graphical objects. Two dimensions are used because the scanned image including the graphical object is inherently two-dimensional. The element of a table for a given pair of indices is the combined line statistics for the corresponding pair of boundaries. For each pair of boundaries, the statistics may include an average line width, total skeleton length, and total line side length along each indexed boundary.

The first line statistic table is generated by looping through each line element of a graphical object in turn. For each line element, a pair of boundaries corresponding to the line sides determines a pair of indices to identify an element of the table. The original object boundary indices, rather than alternative boundary indices, are most desirably selected for the first line statistic table. The line statistics for this line element are then merged with the data of the line statistic table corresponding to these indices. The merging is performed by adding the lengths associated with the current line to the statistics data at the appropriate element of the table, and forming a new width based on a weighted average of the width of the line and the width of the element of the data according to skeleton lengths of the line and the element of the table.

If the indices of the boundaries are i and j, line statistics (width, skeleton length, and lengths on $i^{th}$ and $j^{th}$ boundary indices) are $w$, $L_{skel}$, $L_i$, and $L_j$ for the line element, and the line statistics at the data element (i, j) of the table are $w^{i,j}$, $L_{skel}^{i,j}$, $L_i^{i,j}$, and $L_j^{i,j}$, then the updated table data would be:

$$w^{i,j} = \frac{w^{i,j} L_{skel}^{i,j} + w L_{skel}}{L_{skel}^{i,j} + L_{skel}},$$

$$L_{skel}^{i,j} = L_{skel}^{i,j} + L_{skel},$$

-continued $$L_i^{i,j} = L_i^{i,j} + L_i,$$

$$L_j^{i,j} = L_j^{i,j} + L_j.$$

The line statistics table should be symmetric, and so if the indices are different then the data element (j, i) should also be updated in the same way.

The second line statistic table is also generated by looping through the set of line elements, and combining line element statistics with table elements. In this case, however, if a line side follows an alternative boundary, then the index corresponds to the alternative boundary rather than the original one.

The two line statistics tables can be used to determine which boundaries may be suitable for line shape recognition, and which combination of boundaries might be suitable for multi-contour line shape recognition. For example, the average width around the boundary, $w^i$, skeleton length, $L_{skel}^i$, and side length, $L_{side}^i$, for all lines with a single side on the boundary corresponding to the index can be computed based on line statistics data as follows:

$$w^i = \frac{1}{L_{skel}^i} \sum_{j!=i} w^{i,j} L_{skel}^{i,j},$$

$$L_{skel}^i = \sum_{j!=i} L_{skel}^{i,j},$$

$$L_{side}^i = \sum_{j!=i} L_i^{i,j}.$$

The boundary perimeter length, $L_{bound}^i$, can be computed directly from the geometry of the boundary. Based on these parameters, an estimate of the perimeter of the boundary modified to remove the effect of line thickness, $L_{perim2}^i$, is formed:

$$L_{perim2}^i = \begin{cases} L_{perim}^i - 6w^i & \text{outer boundary} \\ L_{perim}^i + 6w^i & \text{inner boundary} \end{cases}$$

An original object boundary is considered as suitable for line shape recognition if:

$L_{side}^i > 0.6 L_{perim}^i$ and $L_{skel}^i > 0.2 L_{perim2}^i$.

according to the first line statistics table, and also $L_{side}^i > 0.2 L_{perim}^i$ and $L_{skel}^i > 0$.

according to the second line statistics table. An alternative boundary is considered as suitable for line shape recognition if:

$L_{side}^i > 0.6 L_{perim}^i$ and $L_{skel}^i > 0.2 L_{perim2}^i$.

according to the second line statistics table.

The statistics data determined as above permits processing in such a way that if a large fraction of one boundary is being used to construct other boundaries, then it is not necessary to examine that boundary. For example, as seen in FIG. 4(b), all of the parts of the external boundary 410 are included in the constructed boundaries 490 and 493 of FIG. 4(e), so that the boundary 410 may be ignored.

The selection criteria for line-like boundaries can greatly decrease the number of boundaries suitable for line shape recognition in the case of sets of graphical objects having overlapping parts, thereby improving the efficiency of processing. For the case of the graphical object 400 illustrated in FIG. 4(a), for which the line elements are shown in FIG. 4(d) and the constructed paths are represented in FIG. 4(e), the above tests would indicate that the constructed paths are suitable for line shape recognition while the set of original boundaries 421-424 fail the above tests and so are not suitable for line shape recognition.

In addition to the improvement in efficiency there is a second advantage. Some of the original boundaries may correspond to recognisable template shapes, for example boundary 423 of FIG. 4(b) might match to a triangle 16005 while boundaries 420 and 424 might match to a trapezoid 16008, the triangle 16005 and trapezoid 16008 being shown in FIG. 16(a). Matching incorrectly to these shapes would either result in a lower quality output or would require more complicated post-processing to correct the errors.

Figure 10:
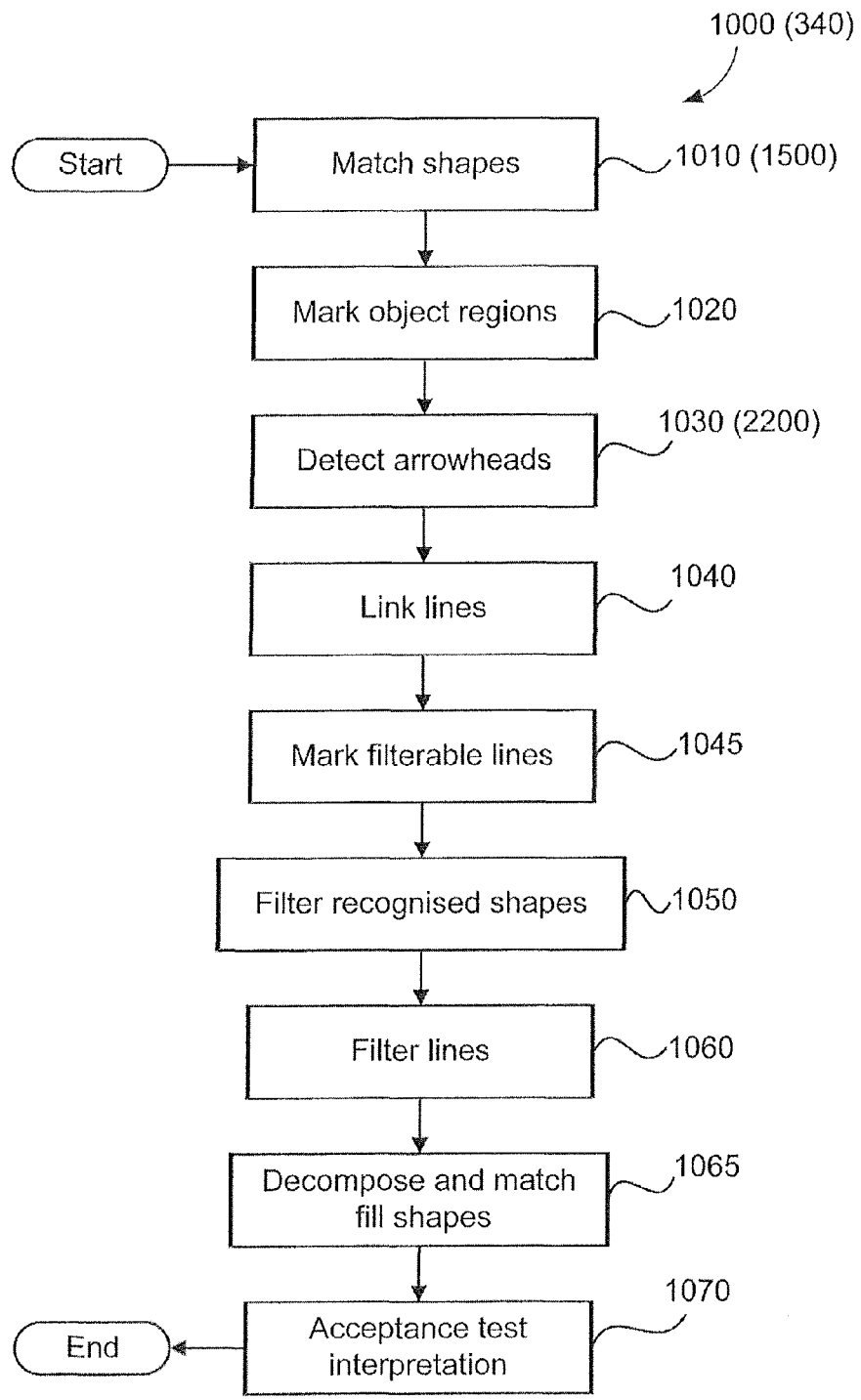
FIG. 10 is a schematic flow diagram of a method of recognising the elements corresponding to a graphical object set as performed at step 340 of FIG. 3.

The line statistic data are used to recognise line shape elements within the set of graphical objects at step 340 in accordance with method 1000 which will be described in more detail below with respect to FIG. 10. FIG. 10 also describes how step 340 performs an analysis of the recognised parts of the graphical object set and makes a decision as to whether the overall interpretation of the shape is of a sufficient likelihood that it should be accepted as one or more distinct graphical objects. The interpretation is tested in step 345, and if the interpretation is accepted then processing continues to step 350 which constructs a new set of graphical objects, according to the decomposed parts of the original graphical object set, based on the set of classified regions from step 340 to replace the graphical object set currently being processed. If the interpretation is not accepted at step 345, processing continues through step 355 which preserves the original set of graphical objects. If there are more graphical objects then processing returns from step 360 back to 305, otherwise the processing of the method 300 ends.

Figure 6:
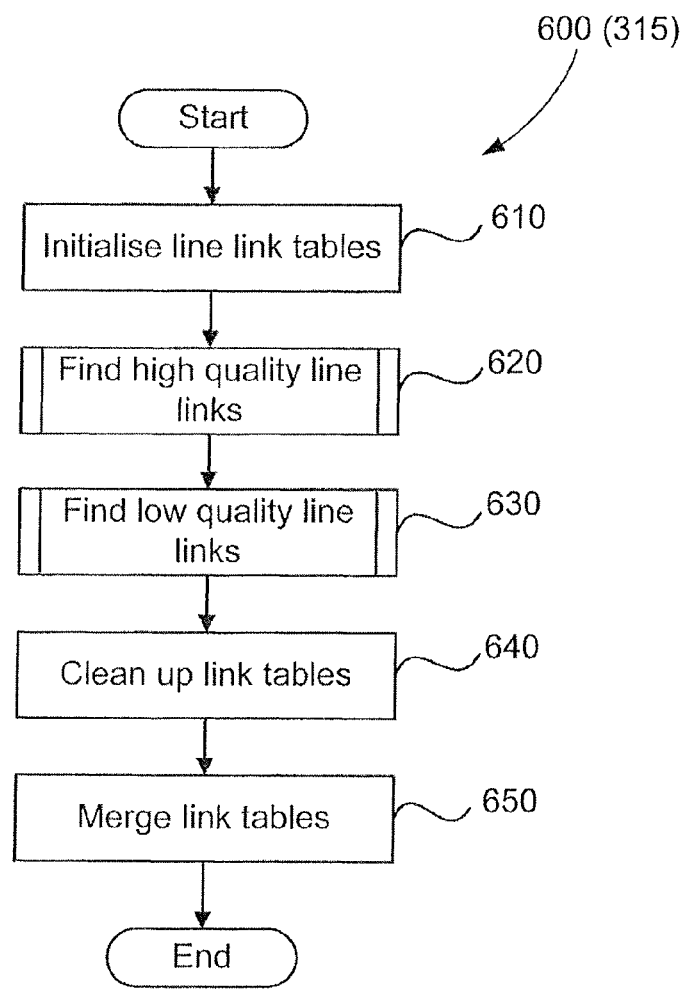
FIG. 6 is a schematic flow diagram of a method for analysing the line elements to find a set of links between the line ends as performed at step 315 of FIG. 3.

FIG. 6 illustrates the method 600 for analysing the line elements to find a set of links between the line ends as performed at step 315. First, at step 610, a pair of line link tables are initialised in the memory 1134 which are configured to store possible links between line ends. The line links may be stored in a variety of forms, such as a sparse symmetric table or an associative array. The indices on each dimension of the table may be the indices of the line elements, and the stored values may correspond to the ends (i.e. front or back) of the lines that are marked as linkable. In some implementations the value may additionally store information relating to the quality of the link.

Step 620 populates the first line link table that stores information relating to higher quality line links. The set of possible line end pairs for linking includes front-to-front, front-to-back, back-to-front and back-to-back line ends for each pair of different open line elements, and front-to-back for each open line, linking to itself. For example, for a pair of open line elements there would be six line end pairs consisting of the four combinations of line end pairs from the first to the second line, and one self linking line end pair for each line individually. For a pair of closed line elements there would be no combinations of line ends to check. Each possible line end pair is considered in turn and a geometric test is performed to determine whether a high quality link exists.

Figure 7A:
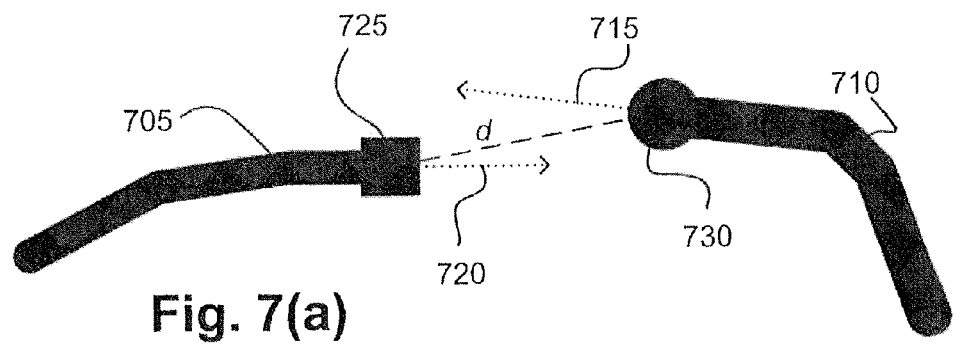
FIG. 7(a), FIG. 7(b) and FIG. 7(c) illustrate various aspects of the merging and geometry of line elements.

A suitable geometric test for line end pair linking is described with reference to FIG. 7(a) which illustrates two lines, 705 and 710. The lines 705 and 710 end at the points 725 and 730 respectively, with respective vector locations $p_1=(x_1, y_1)$ and $p_2=(x_2, y_2)$ in pixel co-ordinates, from which a distance between the two line ends, d, can be computed. The widths of the two lines in pixels are referred to as $w_1$ and $w_2$, and the lengths by $l_1$ and $l_2$. The direction of the line ends 725 and 730 (depicted in FIG. 7(a) by the arrows 720 and 715 respectively) are the vector directions $n_1=(dx_1, dy_1)$ and $n_2=(dx_2, dy_2)$, while perpendicular direction to these are defined as $v_1=(-dy_1, dx_1)$ and $v_2=(-dy_2, dx_2)$ (such that $n_1 \cdot v_1=0$ and $n_2 \cdot v_2=0$). These normalised directions may be obtained by taking the end point of the line, and a point one line width along the line skeleton from the end point, subtracting and normalising. The criteria for accepting the lines ends as linkable with a high quality link are as follows:

$$n_1 \cdot n_2 < 0.95$$
$$d < \text{MIN}(tw, l_1/2, l_2/2)$$
$$p < w$$
$$d_{int} < 3w/2$$
$$\text{MIN}(w_1 w_2) > 0.6 \text{MAX}(w_1 w_2)$$

where $w=\sqrt{16+\text{MAX}(w_1,w_2)^2}$ is a representative width parameter, t is 1 if the vector distance between the line ends suggests they have travelled past each other along the line end directions (as determined by a negative value of the term $(p_1-p_2) \cdot n_2$), or 3 otherwise. The parameter $p=\text{MAX}(v_1 \cdot (p_1-p_2)|,|v_2 \cdot (p_1-p_2)|)$ is a measure of the perpendicular distance between the two line ends, and $d_{int}$ is the length of the section between the two line ends that is inside the graphical object set currently being processed.

Figure 7B:
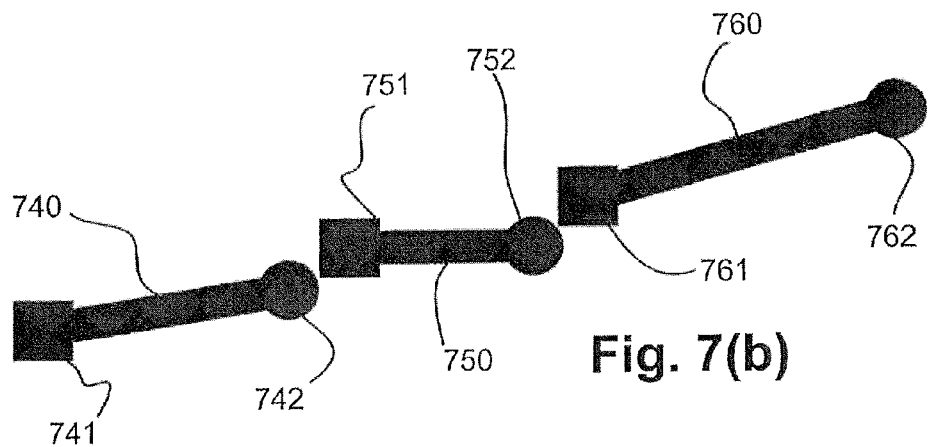

Once all of the line end pairs have been processed, the link table is filtered to remove sets of links that can be merged together. An example set of line elements with links that can be filtered is shown in FIG. 7(b). The three line elements 740, 750 and 760 are roughly collinear and the middle element 750 is relatively short. Line element 740 can link from its back 742 to the front 751 of line element 750 and also to the front 761 of line element 760. Additionally line element 750 can link from its back 752 to the front of 761 of line element 760. In this situation the longest link, from 742 to 761 can be removed from the link table to give a more natural linkage of the line elements. Filtering the link table is achieved by iterating over the link table and looking for line elements with these properties and removing the appropriate links. The filtering improves the quality of the link table, resulting in a high or at least higher quality link table.

Following the population of the high quality link table in step 620, step 630 populates the second line link table that stores information relating to lower quality line links. Each possible line end pair for which the high quality link table is not set is considered in turn and a geometric test is performed to determine whether a low quality link exists. The preferred geometric test for line end pair linking tests that the gap between the line ends is less than a characteristic width parameter (d<w in terms of the parameters defined above with respect to FIG. 7), and the widths are similar ($\text{MIN}(w_1 w_2) > 0.6 \text{MAX}(w_1 w_2)$).

The high and low quality link tables are cleaned up at step 640. The clean-up of a link table involves finding all line ends for which there is more than one link set in the table and then removing all links to these line ends. Next, at step 650, the links from the low quality link table are merged into the high quality link table. For the merging, each low quality link is considered in turn, and if neither line end involved in this link is linked in the high quality link table, then the link is added to the high quality link table. This completes the processing of step 600. The high quality link table is used in various processing steps of method 300.

Figure 8:
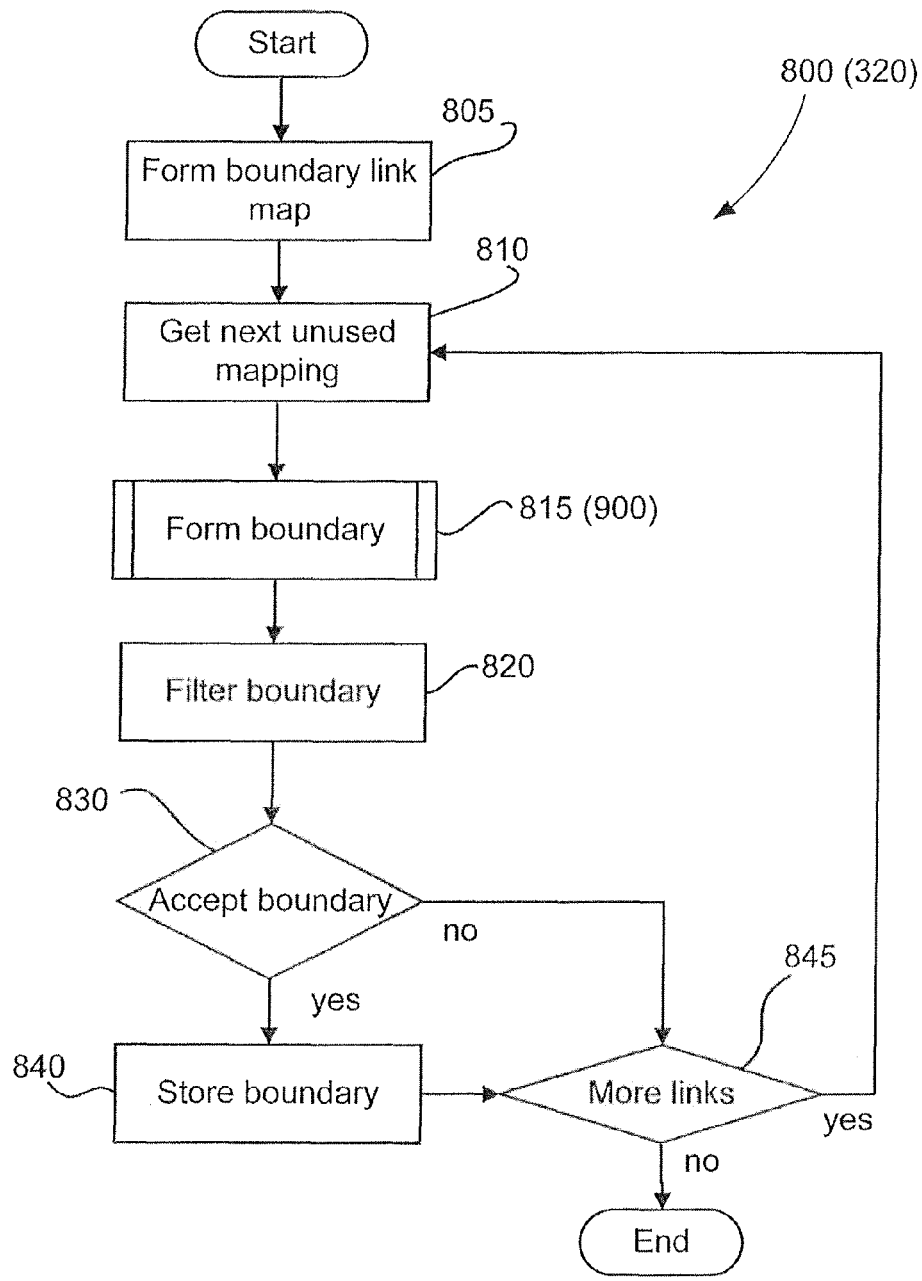
FIG. 8 is a schematic flow diagram of a method of constructing an alterative set of object boundaries based on a set of line links as performed at step 320 of FIG. 3.

FIG. 8 illustrates the method 800 for constructing an alternative set of object boundaries based on this set of line links as performed at step 320 of the method 300. A boundary link map is formed in step 805. The link map contains a set of mappings from one indexed point to another point of the boundaries defining the graphical object set. These mapping pairs may be stored in a suitable data structure such as a map, or simply an array. For each line link in the line link table generated in step 600, two directed mappings are stored such that the direction along the original boundaries is preserved and is deemed or otherwise regarded as "forwards".

Figure 7C:
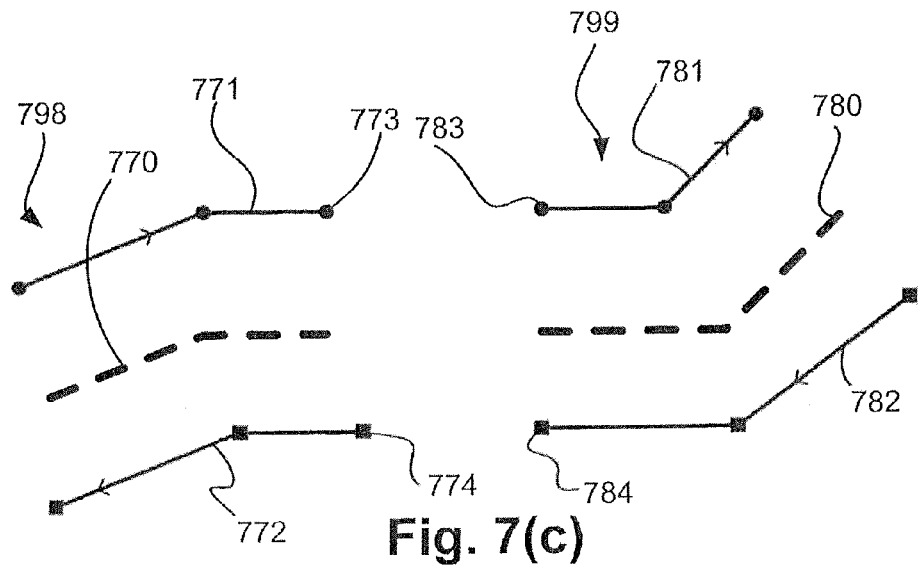

Two mapping pairs resulting from a line element link are illustrated in FIG. 7(c). A first line element 798 is represented by its skeleton, 770, and its side paths, 771 and 772, for which points 773 and 774 are at the linkable line end. A second line element 799 is represented by its skeleton, 780, and its side paths, 781 and 782, of which points 783 and 784 are at the linkable line end. The "forwards" direction along the original boundaries is represented by arrows on the line element sides 771, 772, 781 and 782. The boundaries are oriented so that the line skeleton is inside a graphical object on the right side of the line element side when traversing the line element side in the forwards direction. Mappings are formed such that the direction along the original boundaries is preserved and is forwards. This is achieved for the mapping pairs from point 773 to point 783 and from point 784 to 774.

Returning to FIG. 8, once the boundary link map is formed in step 805, a loop structure is employed to construct a set of alternative boundaries that may form part of an alternative representation of the set of graphical objects. All of the mappings in the link map are initially marked as unused. At step 810 an unused mapping from the link map is selected to seed a new alternative boundary. The pair of boundary points of the mapping are used to initialise the previous and current point values used to form an alternative boundary at step 815. Step 815 is desirably performed in accordance with a method 900 that will be described with reference to FIG. 9 below.

Step 820 employs a filtering process to extract from the alternative boundary formed in step 815, if possible, a simple closed loop of points with an identical start and end point. A simple method of filtering the points is to unmark all links and points that were used to create the boundary, and to then form a new boundary according to the same method 900 used in step 815, but with the previous and current points initialised to the last two points in the unfiltered boundary. Step 830 performs an acceptance test on the filtered boundary, and accepts the filtered boundary if the filtered boundary starts and ends at the same point, the filtered boundary is not self-intersecting, and if the filtered boundary is a new boundary. In this context, the meaning of a new boundary is a boundary that could not be formed by taking an original boundary of the graphical object set and slicing out some small sections of the boundary around line junctions. In one particular implementation, a small section of the boundary is a section shorter than twice the average line width of line elements of the graphical object set that have at least one side on that boundary of the graphical object.

If the alternative boundary is accepted then processing continues to step 840 which stores the alternative boundary then continues to step 845, otherwise processing continues directly to step 845. Step 845 tests for the existence of more links whereupon processing returns to step 810 if there are remaining unused mappings. Otherwise, the processing of method 800 ends.

Method 900 for constructing an alternative boundary based on initialised previous and current point values as performed at steps 815 and 820 will now be described with reference to FIG. 9. At step 905, a new boundary structure is initialised, for example as an empty linked list of boundary points. Next, a loop structure is used to trace and store a boundary. At step 910, the current point is appended to the boundary and the point is marked as used. Next, at step 915 a test is performed on the previous and current points. The current point is defined as a link point if two conditions are met. Firstly, the previous and current points must be consecutive points in the forwards direction along an original boundary of a graphical object. Secondly the current point must be marked in the boundary link map as the first element of a mapping pair. Thus the link point represents a likelihood of an overlap of lines. If the current point was not found to be a link point, then processing continues to step 920, which updates the previous point to the current point and sets the current point to be the next point in the forward direction along the graphical object boundary, then continues directly to step 940. Otherwise, processing continues to step 925 which checks whether the mapping from the current point has already been used. If the mapping has been used, then the processing of method 900 ends, otherwise processing continues to step 930 which sets the previous point to the current point and updates the current point to the second element of the mapping pair from the current point. This essentially adds a connection from the set of line elements defining the boundary to the alternative boundary. Next, at step 935, the mapping is marked as used, and then processing continues to step 940. Step 940 checks whether the updated current point has been previously used. If not, then processing returns to step 910, otherwise the point is added to the boundary a second time and processing of method 900 ends.

Figure 22:
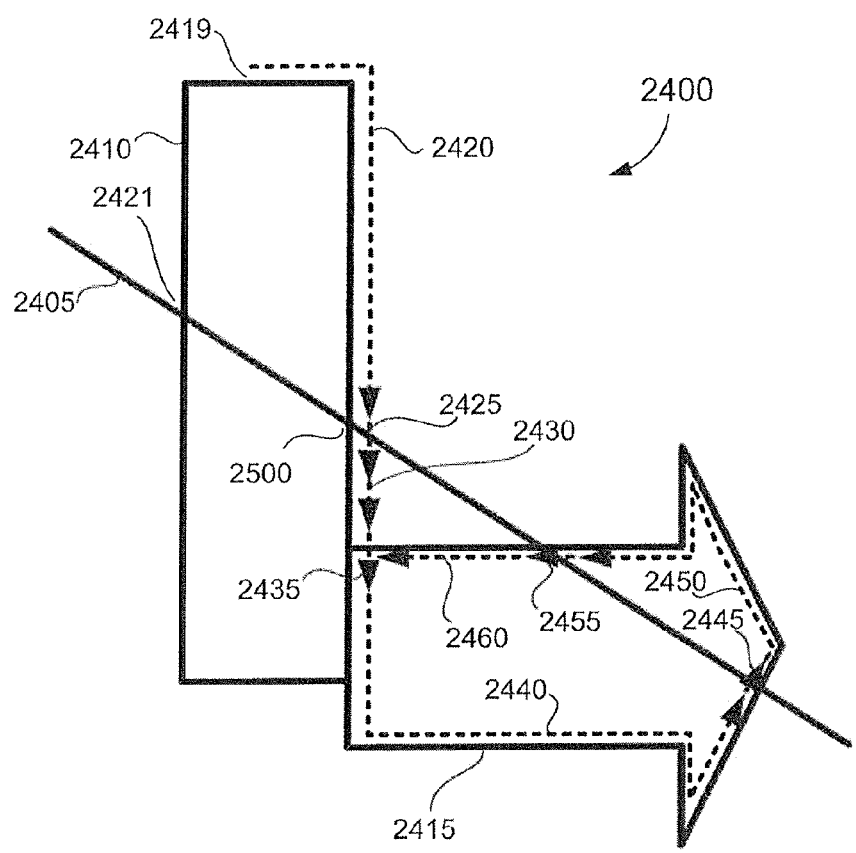
FIG. 22 illustrates various aspects of the processing of a graphical object boundary.

FIG. 22 shows various aspects of generating a boundary map for a graphical object 2400. The object 2400 is made up of three shapes, being a line 2405, a rectangle 2410 and a right arrow 2415. The shapes are positioned so that the three shapes overlap such that the rectangle 2410 and the right arrow 2415 share a common boundary while the line 2405 overlaps the other two shapes. The graphical object 2400 is processed according to method 900 of FIG. 9 where a first point 2419 is selected on the boundary to seed a new alternative boundary. Desirably the seeding first point is located at a point of discontinuity of the boundary, typically coincident with an intersection, link or overlap of lines, such as the point 2421. A number of points are then selected from the first point, along the boundary, as represented by initial boundary section 2420 where the initial boundary section 2420 extends from the first point 2419 to an intersection 2500 between line 2405 and the rectangle 2410. An arrow on the section 2420 indicates the direction of travel along the initial boundary section 2420 in the forward direction with the object 2400 being kept on the right hand side.

Figure 23:
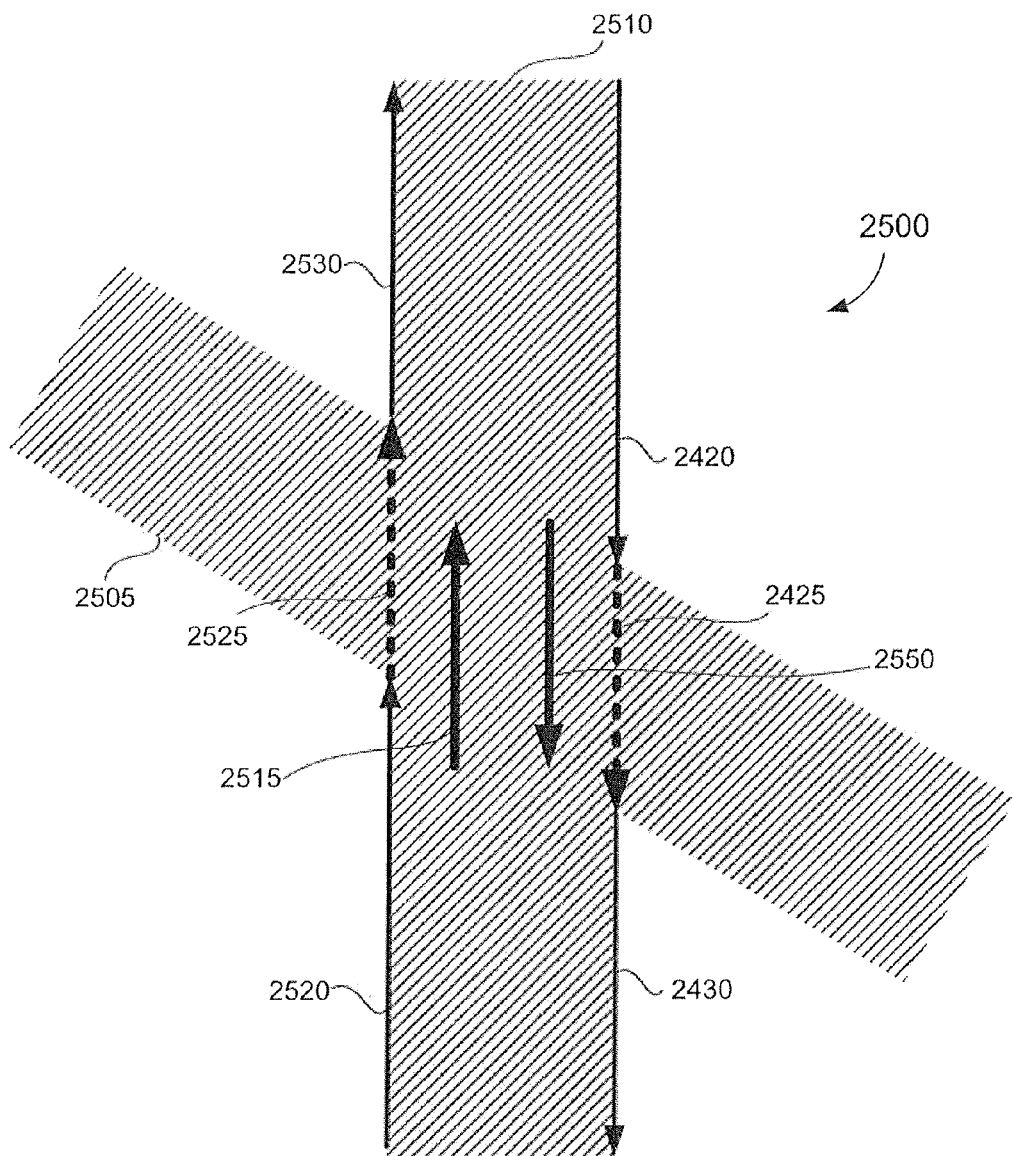
FIG. 23 shows the results of tracking the graphical object boundaries of FIG. 22.

FIG. 23 shows the intersection 2500 in more detail. When processing of boundary section 2420 reaches the intersection 2500, a link 2430 is made based on the previously determined boundary link map. Information from the boundary link map is represented by links 2515 and 2550 and an appropriate link is used depending on which boundary is being followed. Boundary link 2515 would be followed between boundary section 2520 and section 2530 resulting in boundary link 2525. Boundary link 2550 would be followed between boundary section 2420 and section 2430 resulting in boundary link 2425.

Returning to FIG. 22, boundary sections 2420 and 2430 are joined by link 2425 as described above in reference to FIG. 23. Points are then added to the boundary, as represented by the boundary section 2430. At the end of boundary section 2430, a link 2435 is made over an intersection between the boundary of the right arrow 2415 and the boundary of the rectangle 2415. The link 2435 is added to the boundary in a similar manner to the link 2425 so that a start point of a boundary section 2440 is linked to boundary section 2430. At this stage the boundary has swapped from an outer boundary of graphical object 2400 to an inner boundary. Since the boundary has not closed, as the end point of the boundary is not the same as another point in the boundary, then processing of the inner boundary continues.

Once the final point of boundary section 2440 has been found, then a link 2445 is used and points represented by boundary section 2450 are added to the boundary. Line 2455 then links a point at the end of boundary section 2450 to a point at the start of a boundary section 2460. Typically, the boundary section 2460 will only be represented by a start point and an end point, as the boundary section 2460 is a straight line.

Figure 9:
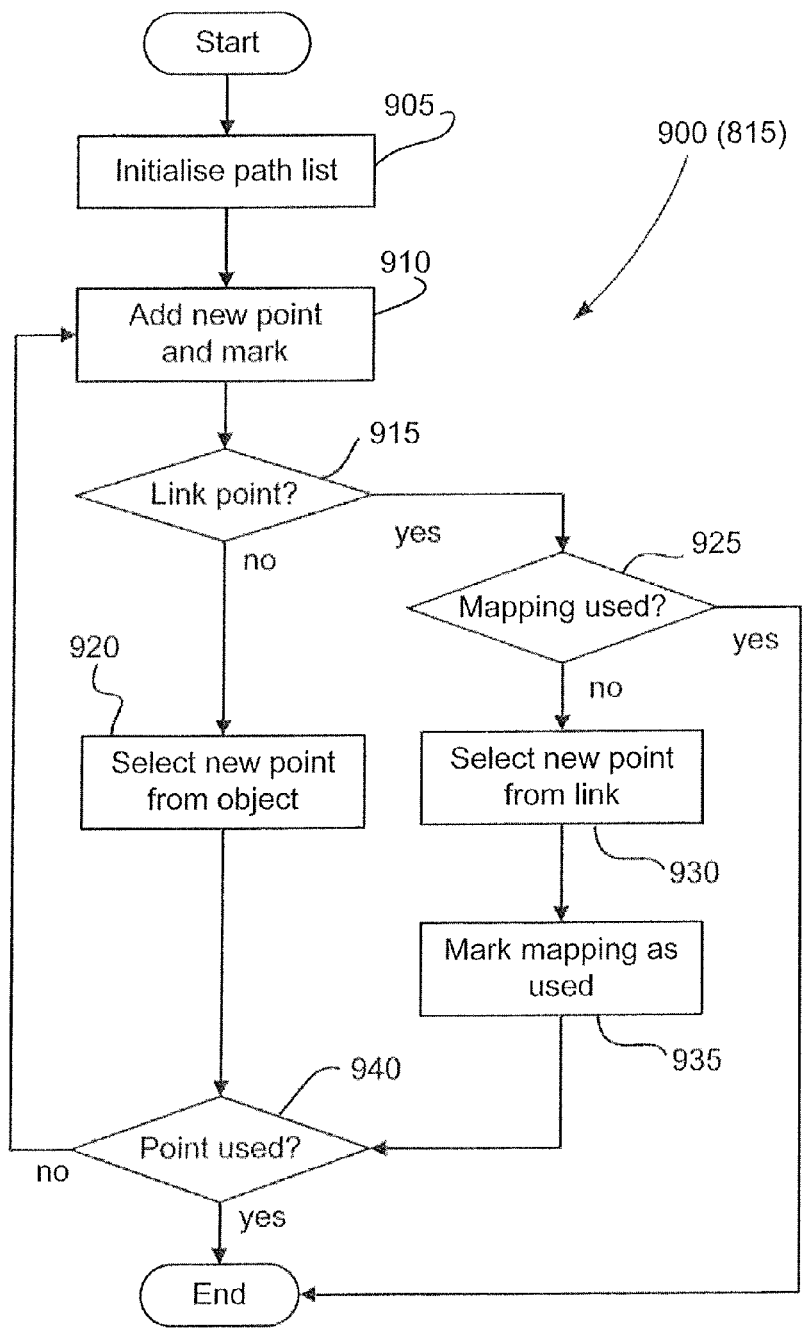
FIG. 9 is a schematic flow diagram of a method of forming a constructed path as performed at steps 815 and 820 of FIG. 8.

At this stage of processing the graphical object 2400 the next point to be selected has already been used, so decision 940 of FIG. 9 is determined to be yes. Processing of object 2400 then proceeds to the filter boundary step of 820 shown in FIG. 8.

Figure 24:
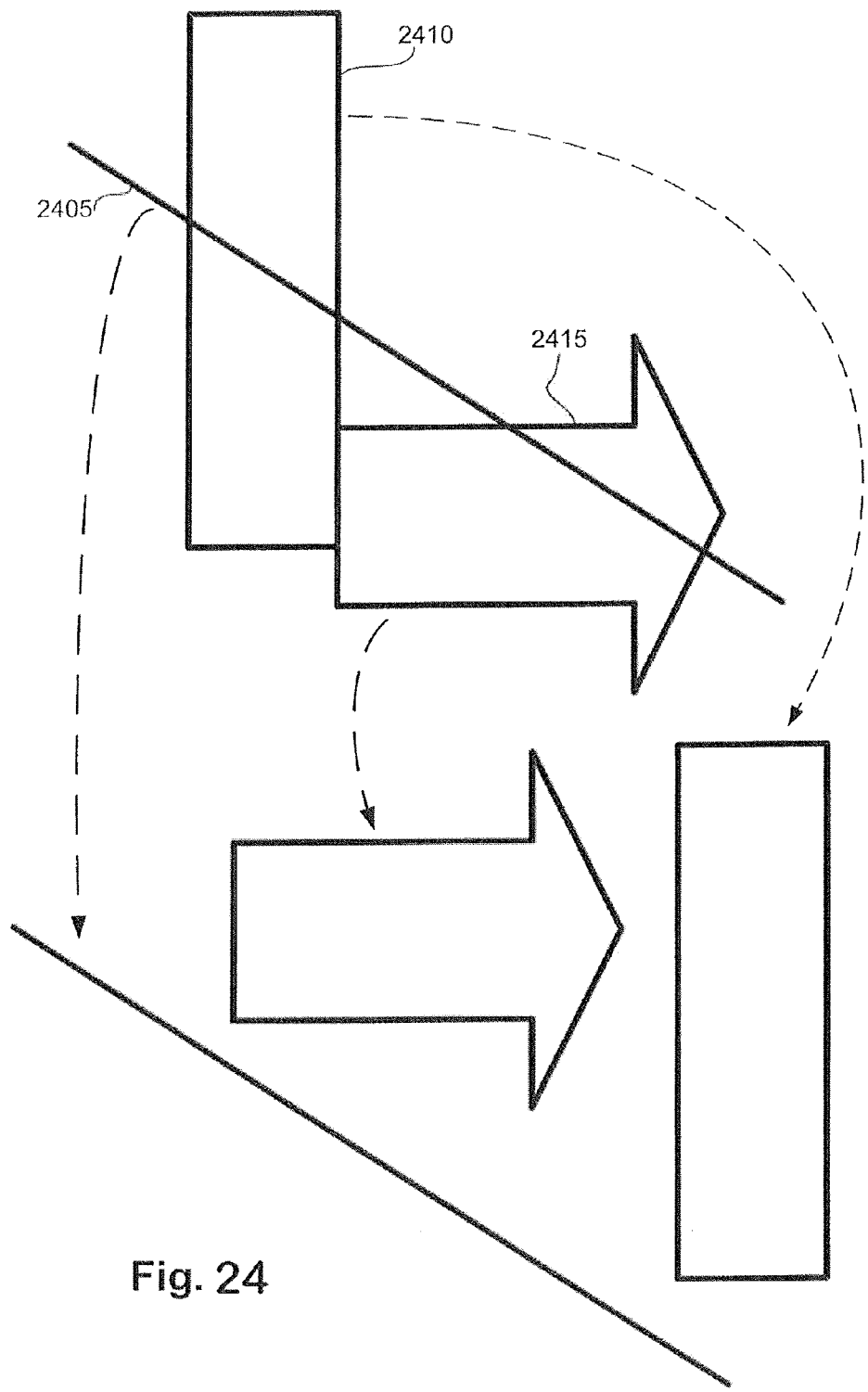
FIG. 24 illustrates an intersection of shapes in the graphical object of FIG. 22.

The boundary object shown in FIG. 22 is then determined to be an inner boundary consisting of boundary segments 2440 to 2460 as they form a closed loop. Boundary segments 2420 to 2435 are discarded from the boundary as they are outside of and thus not part of the closed loop. In this way the boundary of the right arrow shape 2415 can be determined. A similar process can be conducted, starting from different points on the boundary of object 2400, to determine an outer boundary of the line 2405 and an inner boundary of the rectangle 2410. The final separated or decomposed three shapes are shown in FIG. 24.

Method 1000 for recognising line shape elements from a set of graphical objects as performed at step 340 will now be described with reference to FIG. 10.

The method starts at step 1010 which performs shape recognition on the set of original and alternative boundaries. Step 1010 is preferably performed in accordance with a method 1500 which will be described later with reference to FIG. 15. Next at step 1020, some object regions are marked as associated with one or more recognition results from in step 1010. If the object regions are triangles and the centroid of a triangle is contained within an enclosed region around a boundary associated with a recognised shape, then the region may be associated with that shape recognition result. If the recognised shape is a line shape, then the enclosed region may be found by dilating and eroding the boundaries associated with the recognition result by a representative half width value, h, based on the half width of the recognition result, w. A suitable half width value is $h=\sqrt{16+w^2}/2$, where w is the line with of the recognised shape. The enclosed region is between the dilated and eroded boundaries. If, on the other hand, the recognised shape is not a line shape, then the enclosed region may be found as the region inside the outer boundary associated with the match.

Figure 12:
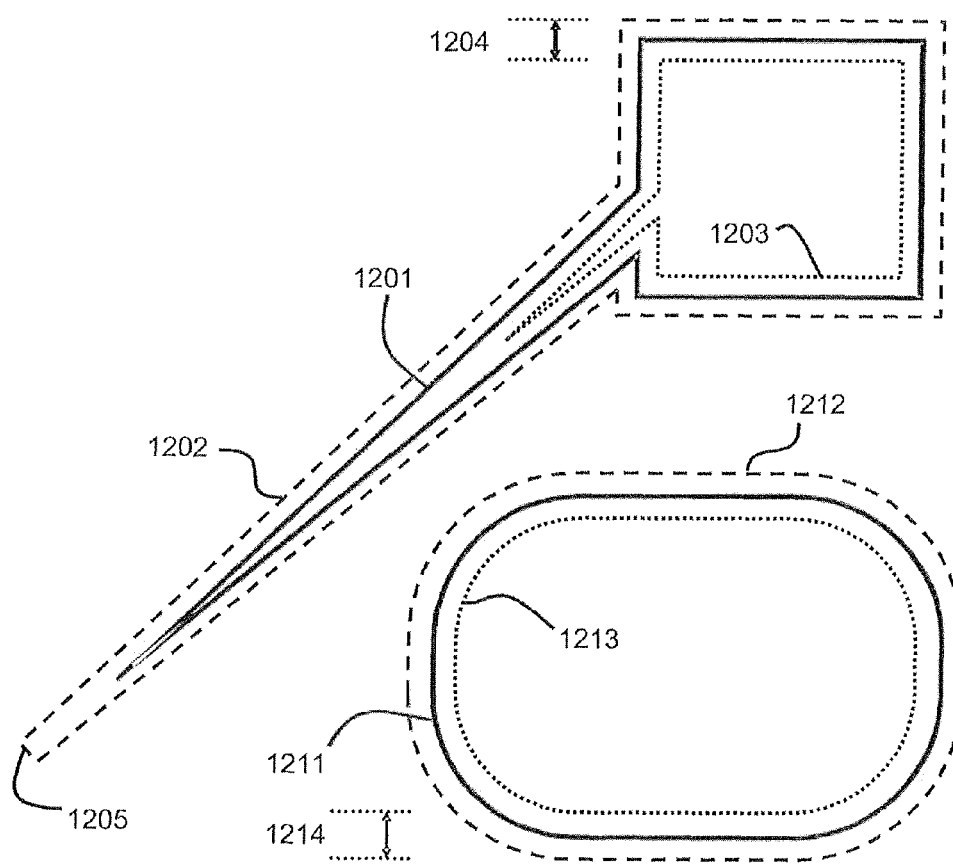
FIG. 12 illustrates dilation and erosion of two boundaries.

FIG. 12 illustrates dilation and erosion of two boundaries, 1201 and 1211. The magnitude of the dilation and erosion (i.e. 2h) is represented by the small arrows, 1204 and 1214. The dilated boundaries are 1202 and 1212, while the eroded boundaries are 1203 and 1213. It is noted that sharp corners may be squared off as shown at 1205. Techniques exist for performing dilation and erosion such as those used in structured text/graphics editing applications to render line objects with non-zero line width.

Once object regions have been allocated to recognised shapes, an arrowhead detection method may be performed at step 1030. Step 1030 may be performed in accordance with a method 2200 that will be described later with reference to FIG. 20. Following arrowhead detection, the set of line elements are linked together at step 1040 according to the line linking data of the table formed at step 315. This can be achieved by stepping through the set of line links in the table in turn. If there are no arrowheads detected on the line end pair for a given link, then the line ends are merged together and the line data updated accordingly. It is necessary to keep track of which line end of the original line element set corresponds to which line end in the merged line set during this step.

Next, a set of filterable lines are marked at step 1045. The purpose of step 1045 is to mark line elements that may be completely described in terms of other recognition results as candidates for removal. All lines which have at least one arrowhead, or have a suitable geometry, and for which some part of the associated region is not allocated to a recognised shape should be preserved, while all other lines are marked as filterable. One test for a suitable line geometry is that the minimum length either side paths or the skeleton is greater than 3 times the average width of the line.

Following the marking of filterable lines, the recognised shape results are filtered at step 1050. The purpose of this processing step is to remove any shape recognition results that are superfluous to the overall interpretation of the set of graphical objects so that the interpretation is a simple as possible—the simplest interpretation is often the most natural and most likely to represent the original intent of the author of the document 110. The set of original graphical object boundaries are considered in turn. If a boundary is associated with a recognised shape then all regions associated with the recognised shape (as marked at step 1020) are inspected in turn. The total external boundary length around these regions, $b_{total}$ is calculated, as is the total external boundary length in regions for which an alternative interpretation exists (either a different recognised shape or a non-filterable line), $b_{share}$. Once all regions have been inspected a recognised shape is tagged as filterable if the shared length is greater than 95% of the total length ($b_{share} > 0.95 b_{total}$). When all of the original graphical object boundaries have been tested in this way, the set of recognised shapes that have been tagged as filterable are deleted, and all regions associated with the recognised shape have that association removed. On completion of the filtering of recognised shapes for original boundaries, the filtering is repeated for the alternative boundaries.

Once the recognised shapes have been filtered in step 1050, the lines are filtered at step 1060. The same test for filterable lines is applied as was described in step 1045 that marked filterable lines, however the results of the testing may be different given that some of the recognised shapes may have been removed during step 1050. All filterable lines are therefore deleted in step 1060.

Next, at step 1065, each region is classified in order of preference as part of a specific recognised shape, part of a specific line/arrowhead or as an unrecognised region. In a preferred implementation, lines and arrowheads are constructed directly based on triangular regions, and the set of regions associated with them is known. On the other hand shapes are recognised based on boundaries (object and alternative) and line statistics. The regions may be interpreted as part of a recognised shape using the method described in step 1020 above.

If a given region may be classified as part of more than one recognised shape, then it is useful to select the shape to which the region is to be allocated in a consistent manner, for example through an order of preference of the shape matches. Sets of adjacent regions with the same classification are grouped together to form new graphical objects. These objects have one outer boundary and may also have inner boundaries. The boundaries may be found by tracking around the outer edges of the set of adjacent regions. The outer edges of a region are the edges of the region that are not adjacent to another region that has the same classification (i.e. it is not part of the same recognised shape or line/arrowhead, and the regions are not both unrecognised).

For the triangular regions shown in FIGS. 13(c) to 13(f), a total of five objects would be generated in this way. The first two objects would be line shape objects 1341 and 1342 marked in FIG. 13(e). The first line object 1341 has two inner boundaries, while the second 1342 has just one inner boundary. The third and fourth objects would be lines with arrowheads. These are constructed from the line elements and arrowhead regions from FIGS. 13(d) and 13(f), (1334 with 1355, and 1335 with 1356). The last object would correspond to the rounded rectangular object in the middle of the graphical object 1300, and would have no inner boundaries.

Figure 13D:
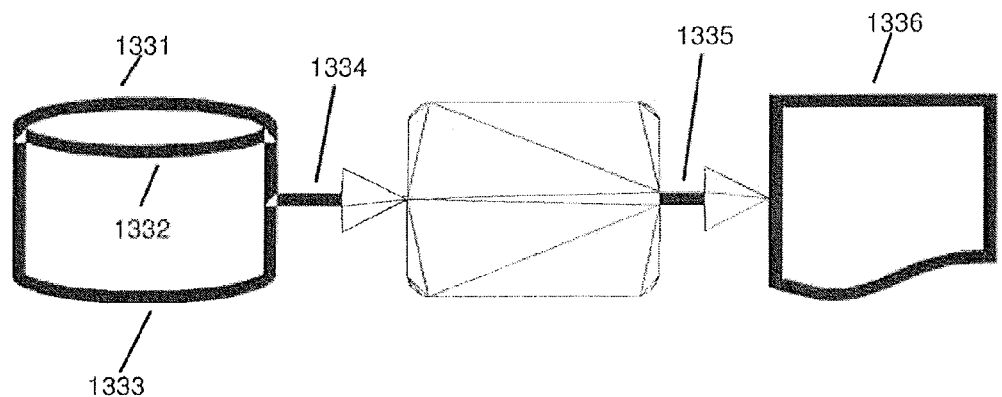
Figure 13E:
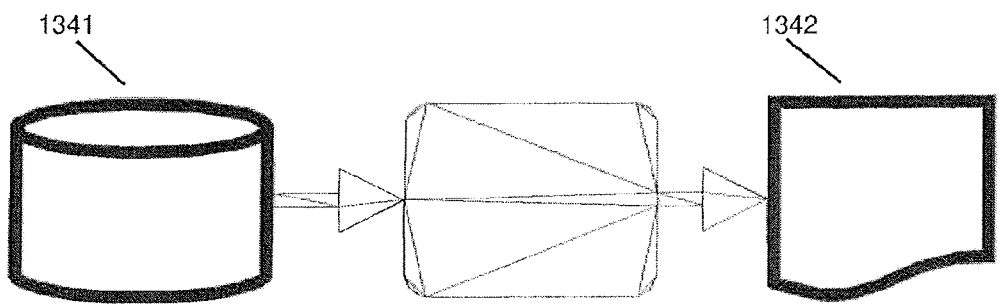
Figure 13F:
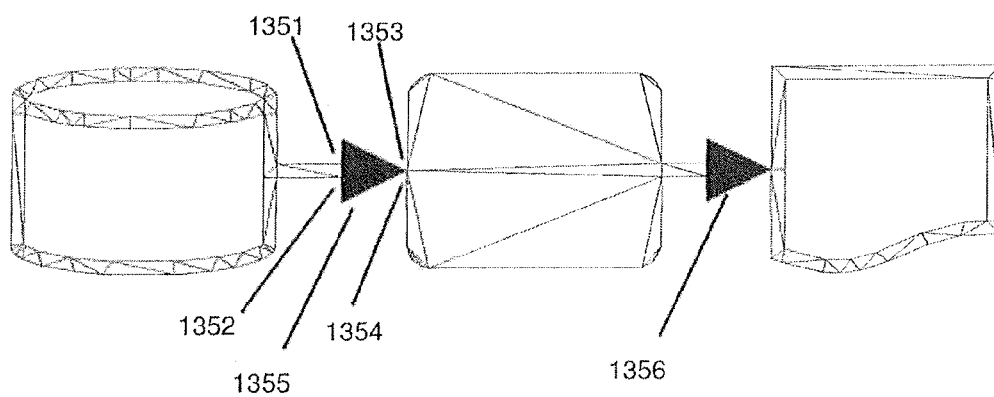

Unrecognised objects that are small and can be considered as noise may be merged with adjacent objects. Larger unrecognised objects may be processed by shape recognition to find solid (i.e. not line) template shapes. In the example of FIG. 13(f), all triangular regions of the graphical object are marked as parts of shapes, lines or arrowheads, except for the large central part which would be matched as a rounded rectangle 16002 seen in FIG. 16(a).

The final step 1070 of the method 1000 is to perform an acceptance test for the interpretation of the original graphical object set in terms of the new objects. The decision may be made based on a metric related to the geometry of the interpretation. Each region of the original graphical object set is tagged according to one of five classes and the graphical object data is stored in the computer memory 1106,1109 for subsequent use in describing the page from which the bitmap image data was sourced. The classes are line, simple template shape (e.g., rectangles, ellipses, and parallelogram template shapes), standard template shape (all other recognised template shapes), arrowheads and other. A length counter is initialised to zero for each of five possible classes, and these are referred to as $L_{line}$, $L_{simple}$, $L_{shape}$, $L_{arrowhead}$, and $L_{other}$. For each region in turn, the total external edge (i.e. the part of the region not adjacent to other regions) is added to the length counter for the appropriate class. The acceptance test for the decomposition of the graphical object set is that at least one of the following conditions is met:

$$L_{line} + L_{simple} + L_{shape} + L_{arrowhead} > 400 + L_{other}.$$

OR $$L_{line} + 2L_{simple} + 8L_{shape} + 3L_{arrowhead} - 8L_{other} > 0.$$

The method 1000 then ends, returning the decomposed interpretation of the graphical object set in terms of new objects with classifications and recognition results, and the results of the acceptance test for the interpretation. According to the result of the acceptance test 1070, the decomposed interpretation of the objects may replace the original set of graphical objects at step 350.

Figure 15:
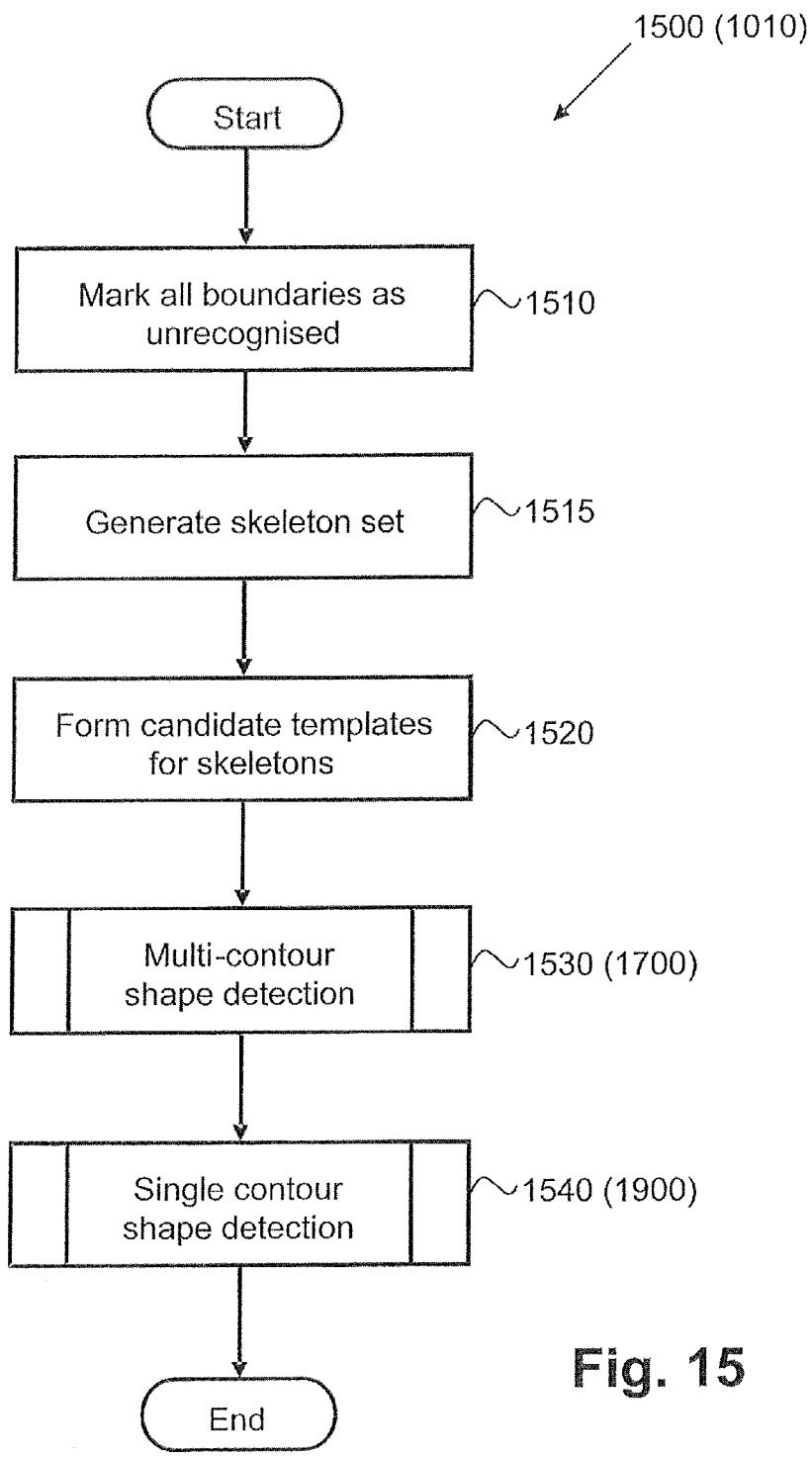
FIG. 15 is a flowchart showing template shape matching for the graphical object using the line statistics data.
Figure 16A:
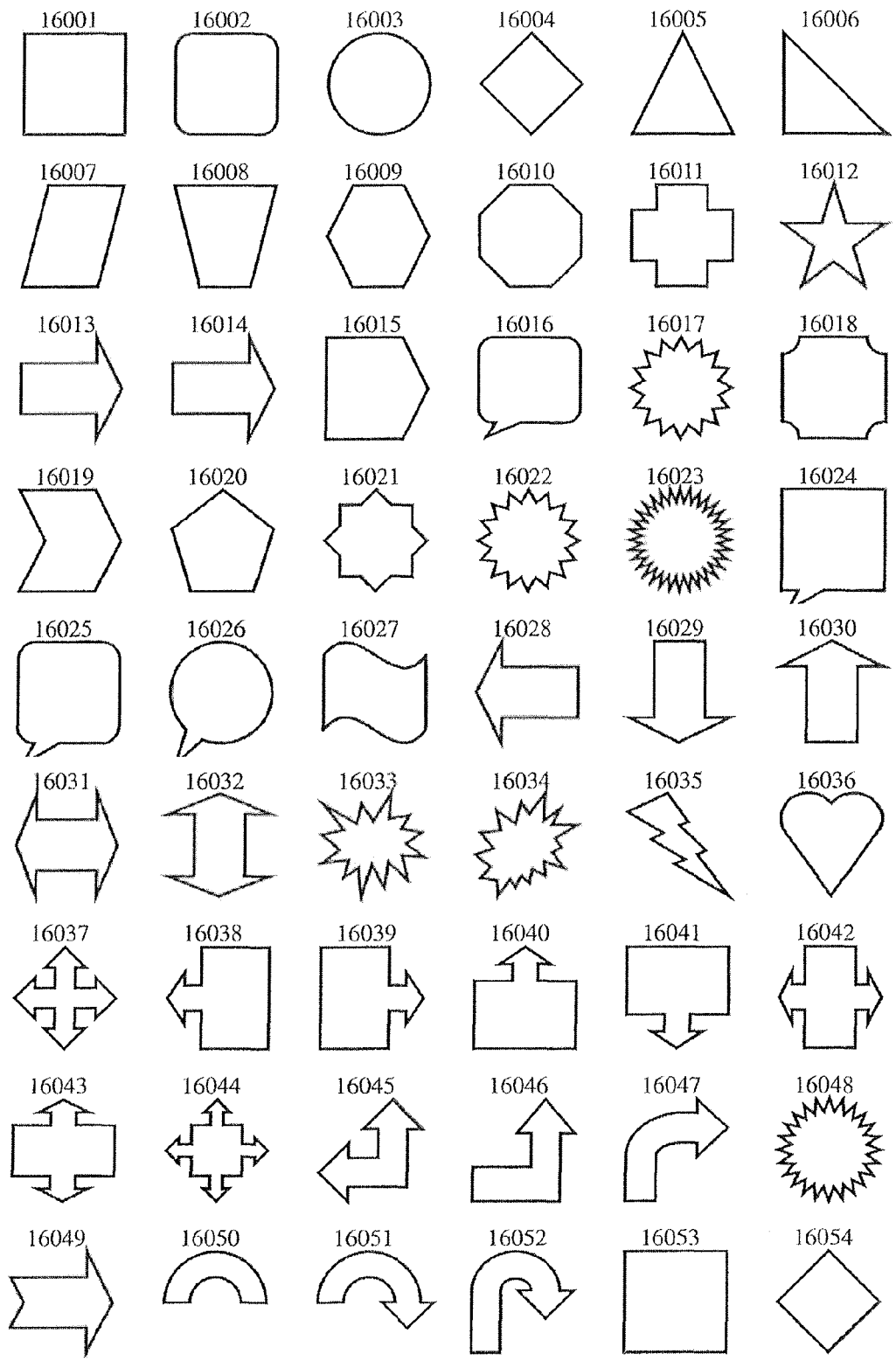
FIG. 16(a) and FIG. 16(b) show a selection of the Microsoft™ AutoShapes.
Figure 16B:
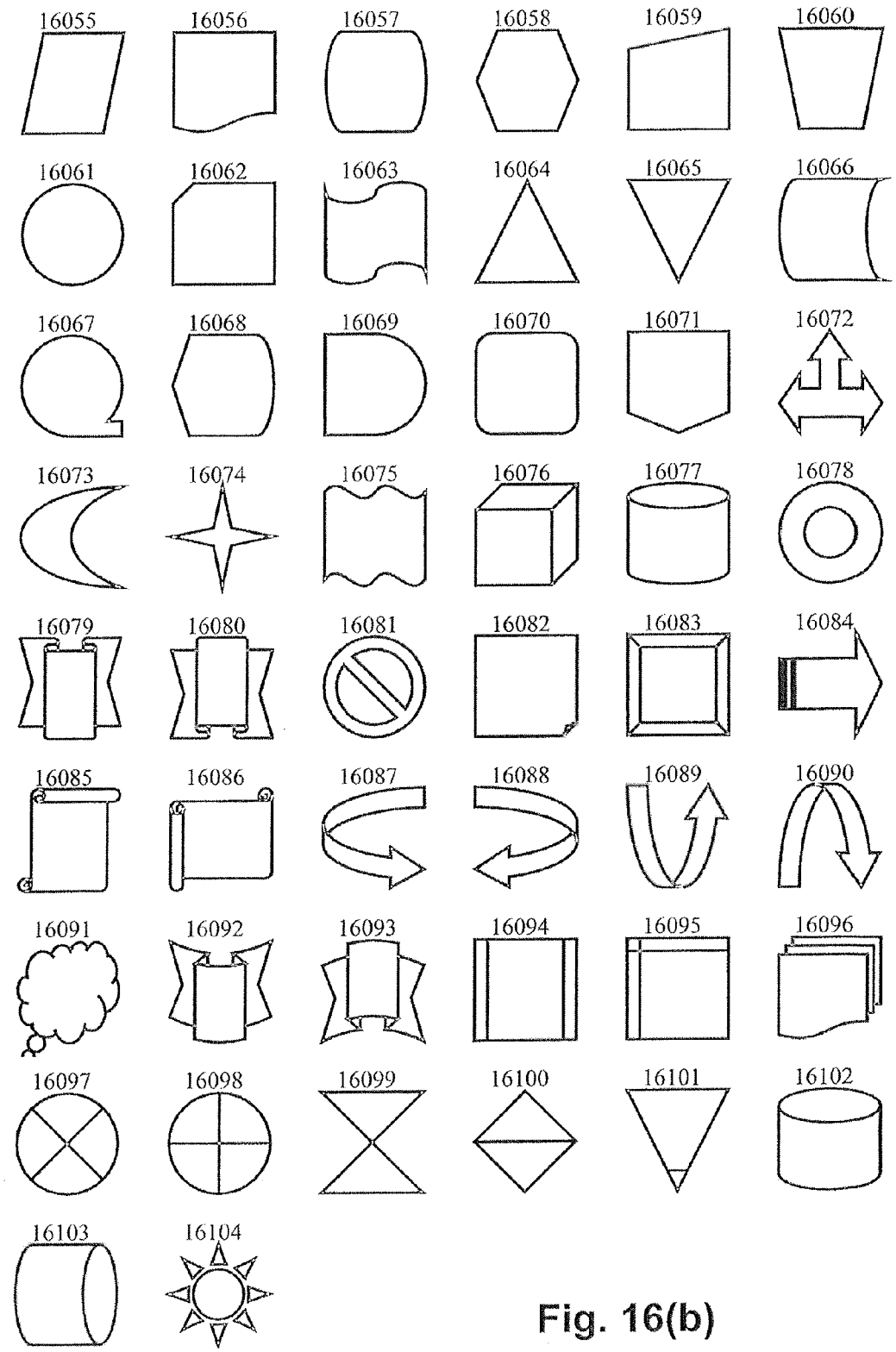

The method 1500 of matching shapes within the graphical object as executed at step 1010, will now be described with reference to FIG. 15.

At step 1510, all object and alternative boundaries are marked as unrecognised. Next, at step 1515, a set of skeletons are generated corresponding to the set of object boundaries and alternative boundaries determined to be suitable for line shape recognition according to the criteria described at step 325. For inner boundaries, this is achieved by dilating the boundary by half the average width ($w_i/2$), and for outer boundaries it is achieved by eroding the boundary by half the average width ($w_i/2$), where $w_i$ is the average line width around the boundary with index i computed as described at step 325. As discussed previously, FIG. 12 illustrates dilation and erosion of two boundaries.

For the example of FIG. 4, all alternative boundaries, 490 to 493, are considered suitable for line shape recognition while the original boundaries are not. For the example of FIGS. 5(*a*) to 5(*d*), all boundaries (inner and outer) are considered to be suitable for line shape recognition. For the boundaries of FIGS. 13(*a*) to 13(*f*), all three inner boundaries, 1311 to 1313, are considered to be suitable for line shape recognition, while the outer boundary 1310 is not.

Processing then continues to step 1520 which assigns a set of candidate shapes to each skeleton. This can be achieved, for example, by generating a feature set based on Fourier Descriptors for a suitably normalised representation of each boundary in turn. The normalisation process may include a matrix transform designed to yield a boundary with specified central moments. The normalised shape feature vector is analysed using a previously trained machine learning classifier to generate candidate template shapes. The classifier is preferably trained using a suitable machine learning algorithm such as the Support Vector Machine (SVM) algorithm and includes classes corresponding to the one or more contours of each of a set of selected template shapes. Some contour classes may be merged into the same class in the classifier—for example the upper contour of a can AutoShape 16077 listed in Appendix A and shown in FIG. 16(*b*) is an ellipse 16003 (FIG. 16(*a*)) and is merged into that class. Likewise two contours of a cube 16076 (FIG. 16(*b*)) are parallelograms and are merged into the parallelogram class 16007 (FIG. 16(*a*)).

Processing then continues to step 1530 which performs multi-contour template shape detection. This may be performed in accordance with a method 1700 which will be described in detail with reference to FIG. 17. Following step 1530, at step 1540, single contour template shape recognition is performed, desirably in accordance with a method 1900 which will be described in detail with reference to FIG. 19. This completes the processing of the method 1500.

Figure 17:
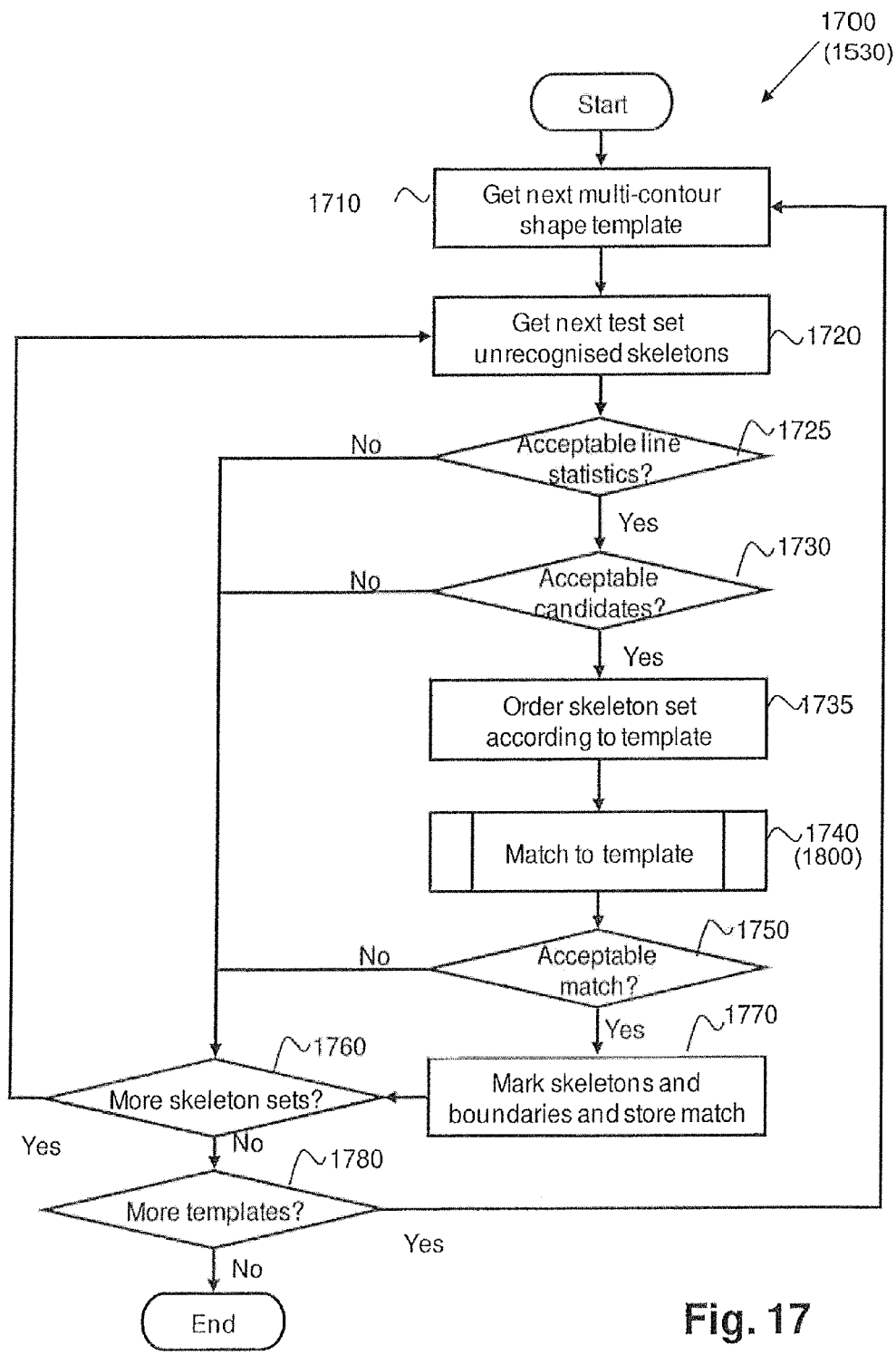
FIG. 17 is a flowchart showing template matching of parts of the graphical object for multi-contour template shapes.

The method 1700 of matching multi-contour template shapes to parts of the graphical object set as executed at step 1530, will now be described with reference to FIG. 17.

Processing starts at step 1710 which selects the next multi-contour shape template. The next multi-contour shape template may be a cube, a can or any other multi-contour shape from Table 1 of AutoShapes included in Appendix A at the end of this detailed description. The multi-contour template is assumed to have N contours, and the graphical object set is assumed to have M inner skeletons. These inner skeletons are the set of skeletons generated at step 1515 which correspond to inner boundaries (original object or alternative).

At step 1720, the next set of N inner skeletons that have not yet been assigned a recognised shape are selected from the set of M inner skeletons. This can be achieved by looping through all combinations of N skeletons selected from the M inner skeletons and discounting any set that includes a skeleton associated with a previous recognition result.

At step 1725, the line statistics between the set of object and alternative boundaries that correspond to the selected set of skeletons are compared with the required statistics for the multi-contour template shape. For example, for the can 16077 or cube 16076 AutoShapes listed in Appendix A and shown in FIG. 16(*b*), all boundaries must share line statistics with all other boundaries. On the other hand, for the Flow Chart Multidocument AutoShape 16096, one boundary should share line statistics with all of the other boundaries. For the curved arrow AutoShapes 16087 to 16090 there are no requirements for shared line statistics between the inner boundaries. Similar rules can be determined or established for the other multi-contour AutoShapes. If the line statistics are considered acceptable according to the above rules, then processing continues to step 1730, otherwise processing returns to step 1720.

Step 1730 tests whether the set of candidate template shapes for the set of skeletons is acceptable with respect to the required set of candidate template shapes contours. This is achieved by testing all ordered sets of the skeleton set. The candidate shapes for each skeleton in the ordered set are compared with the required candidates for each contour of the multi-contour template shape. If any ordered set includes candidates for all skeletons that match the required candidates for the contours of the multi-contour shape then the set is accepted and processing continues to step 1735, otherwise processing continues to step 1760.

At step 1735, the set of skeletons are ordered to match the set of contours in the template shape. The method of achieving this depends on the specific template. For example, in the case of the can AutoShape 16077 listed in Appendix A and shown in FIG. 16(*b*), the skeleton with the smaller area or bounding box is the upper contour and the skeleton with the larger area or bounding box is the lower contour. On the other hand, the skeleton corresponding to the contour defining the front face of the cube AutoShape 16076 is the one that best matches a rectangle, and the other two may be selected using geometry. For example, a geometrical selection may be performed by defining a triangle with vertices at the centroids of the three skeletons starting at the front contour and then passing through the other two, then keeping this order if the triangle perimeter is clockwise, or swapping the other two if it is anticlockwise. Various simple geometric rules can be defined for the other multi-contour template shapes.

Processing then continues to step 1740 which performs a match between the template shape and the skeleton set. This matching may be performed in accordance with a method 1800 which is described in detail below with reference to FIG. 18. A line width, determined as the average line width around the boundary set corresponding to the current set is also supplied at step 1740. This average line width may be calculated based on a weighted average of line width parameters for each boundary individually, $w_i$, where the weighting of each boundary width is given by the skeleton length of lines around the boundary $L_{skel}{}^i$. The width and length parameters, $w_i$ and $L_{skel}{}^i$, were defined in step 325. The match is then compared to a threshold value at step 1750 to determine acceptability of the match. The threshold is set to 0.95 in one implementation, however this value may vary to be template shape specific in alternate implementations. If the match score exceeds the threshold then the match is accepted and processing continues to step 1770. Otherwise processing continues to step 1760.

At step 1770 each of the skeletons of the current set and the corresponding boundaries is marked as a recognised line shape with the current match score, average width determined at step 1740, template shape identity, and all of the parameters associated with the match (scaling, rotation, offset and control parameters). Processing then continues to step 1760.

Step 1760 checks whether there are more skeleton sets to be tested. If there are, the processing returns to step 1720, otherwise processing continues to step 1780. Step 1780 checks whether there are more multi-contour templates to check. If there are then processing returns to step 1710, otherwise the method 1700 ends.

Figure 18:
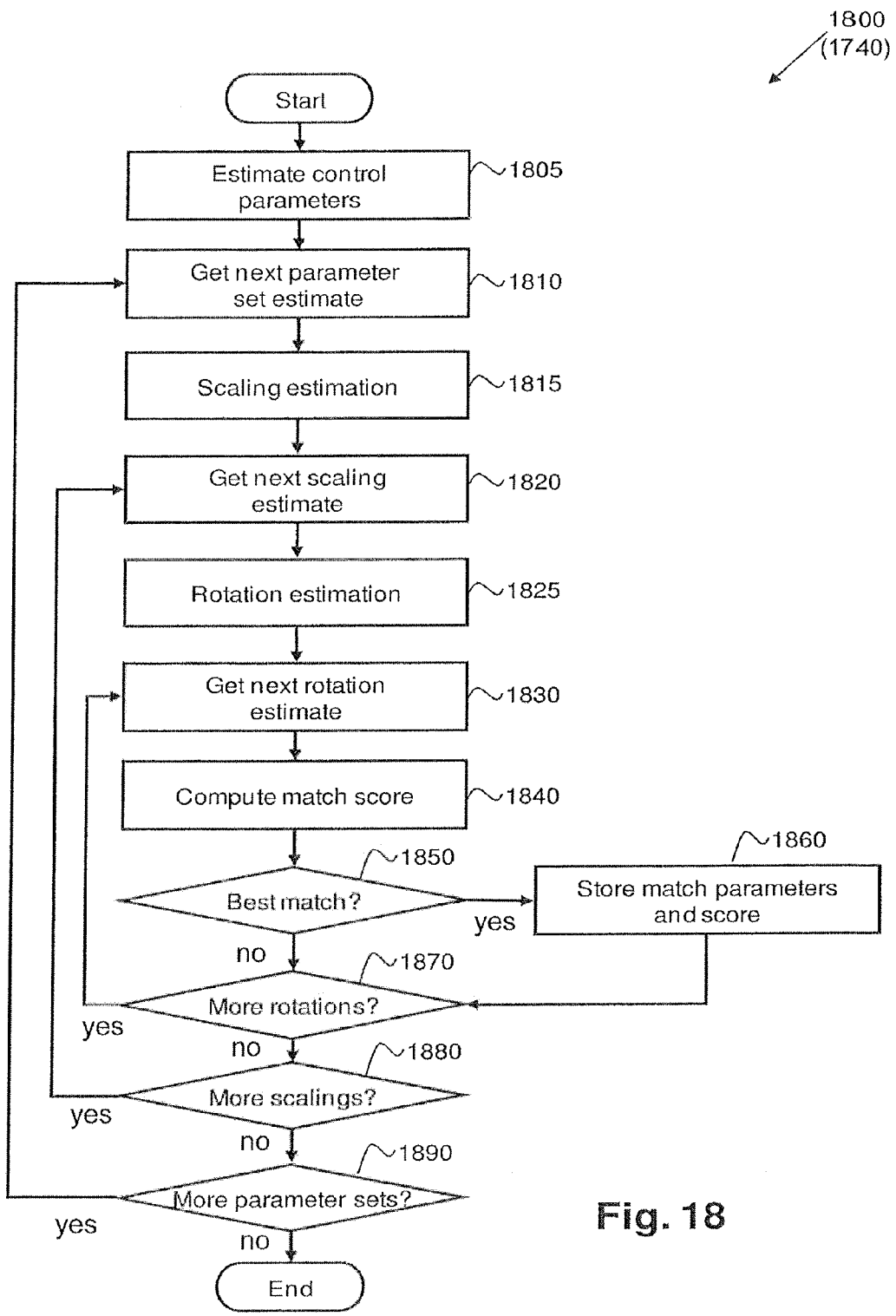
FIG. 18 is a flowchart showing the stages of a template matching including parameterisation.

The method 1800 of matching a set of one or more skeletons to the contours of a template shape with the same number of contours, as executed at step 1740 and also at step 1940 (to be discussed later), will now be described with reference to FIG. 18. The same method can also be used to match a set of boundaries to the contours of a template shape. A line width may be supplied along with the set of skeletons and the template shape to be matched to.

Method 1800 begins with step 1805 which performs control parameter estimation for the given template shape. If the template shape does not have any control parameters then an empty set of control parameters is passed to the next step 1810. Techniques exist that perform control parameter estimation based on the minimisation of an error function defined by the comparison of skeleton sets and the contours of the template shape. The comparison may be in terms of Zernike moments of normalised skeleton or contour sets, which may be computed efficiently using algebraic sums based on the coordinates of each edge section of the skeleton or contour sets. Some template shapes may include specific customised parameter estimation methods, for example based on the specific geometric features of the skeleton set, and in some cases the parameter estimation method may supply other match parameters such as scaling and rotation parameters.

Step 1810 operates to select the next available control parameter set estimate. Step 1815 determines scaling estimates for the current control parameter set estimate from step 1810 (including the empty set for shapes with no control parameters). If the scaling estimate is provided with the current parameter set then this value is taken. Otherwise, a variety of techniques exist for estimating the scaling, some of which are based on a comparison of rotationally invariant combinations of central moments of the set of skeletons with the contours of the template with the appropriate set of control parameters. Techniques exist for computing such moments efficiently using algebraic sums based on the coordinates of each edge section of the skeleton or contour. More than one scaling estimate may be generated for each set of estimated parameters which are passed to the next stage of processing. Additionally, an extra scaling estimate may be included if the template is the ellipse AutoShape 16003 of FIG. 16(*a*). The estimate is defined by scalings $s_x = s_y = \sqrt{M_{00}/m_{00}}$ where $M_{00}$ is the area of the combined set of skeletons and $m_{00}$ is the area of the template contour set, and a rotation estimate of 0° is associated with this estimate. This additional estimate is required for the case of a degeneracy in the rotation estimate at the next stage of processing.

Next, at step 1820, the next scaling estimate is selected for the current control parameter set, then step 1825 computes rotation estimates for the current control parameter and scaling estimate set. If the rotation estimate is provided with the current parameter value and scaling set then this value is taken. Otherwise, a variety of existing techniques may be used, some of which are based on a comparison of central moments of the set of skeletons with the contours of the template.

One such technique is based on comparing fourth order central moments for the parameterised and scaled template contours $\{m_{40}, m_{31}, m_{22}, m_{13}, m_{04}\}$ with the central moments of the skeleton set $\{M_{40}, M_{31}, M_{22}, M_{13}, M_{04}\}$. The following terms are then computed:

$$dm_{024} = m_{04} - 6m_{22} + m_{40}$$

$$dM_{024} = M_{04} - 6m_{22} + M_{40}$$

$$dMm_{04} = m_{04} - M_{04} + m_{40} - M_{40}$$

$$dm_{13} = m_{13} - m_{31}$$

$$dM_{13} = M_{13} - M_{31}$$

$$dMm_{22} = -m_{22} + M_{22}$$

$$Denom_4 = dm_{024}dm_{024} + 16dm_{13}dm_{13}$$

$$Sol_{4A} = Denom_4 - 16dM_{13}dM_{13}$$

$$Sol_{4B} = dm_{13}dm_{13} + dMm_{22}dm_{024} - 4dMm_{22}dMm_{22}$$

$$Sol_{4C} = -(dMm_{04}(dMm_{04} - dM_{024}) - 2dm_{13}dm_{13})$$

$$sign_4 = \begin{cases} 1 & m_{13} - m_{31} > 0 \\ -1 & \text{otherwise} \end{cases}$$

If the denominator term ($Denom_4$) is zero then no rotation estimates are found for the current control parameter and scaling set. Otherwise, the following terms are calculated:

$$\begin{cases} x_{A1} = 16 * dM_{13}dm_{13} - dm_{024}s_{4A} \\ y_{A1} = -4dM_{13}dm_{024} - 4dm_{13} * s_{4A} \end{cases}$$

$$\begin{cases} x_{A2} = 16dM_{13}dm_{13} + dm_{024} * s_{4A} \\ y_{A2} = -4dM_{13}dm_{024} + 4dm_{13}s_{4A} \end{cases}$$

$$\begin{cases} x_{B1} = dm_{024}dm_{024} - 8dMm_{22}dm_{024} + 16dm_{13}s_{4B} \\ y_{B1} = -4dm_{024}s_{4B} + 4dm_{024}dm_{13} - 32dm_{13}dMm_{22} \end{cases}$$

$$\begin{cases} x_{B2} = dm_{024}dm_{024} - 8dMm_{22}dm_{024} - 16dm_{13}s_{4B} \\ y_{B2} = 4dm_{024}s_{4B} + 4dm_{024}dm_{13} - 32dm_{13}dMm_{22} \end{cases}$$

$$\begin{cases} x_{C1} = -3dm_{024}dm_{024} + 4dM_{024}dm_{024} + 8dm_{13}s_{4C} \\ y_{C1} = 16dM_{024}dm_{13} - 12dm_{024}dm_{13} - 2dm_{024}s_{4C} \end{cases}$$

$$\begin{cases} x_{C2} = -3dm_{024}dm_{024} + 4dM_{024}dm_{024} - 8dm_{13}s_{4C} \\ y_{C2} = 16dM_{024}dm_{13} - 12dm_{024}dm_{13} + 2dm_{024}s_{4C} \end{cases}$$

where $$s_{4A} = sign_4\sqrt{Sol_{4A}}, \, s_{4B} = sign_4\sqrt{Sol_{4B}}, \, s_{4C} = sign_4\sqrt{2Sol_{4C}}.$$

If the term $Sol_{4A}$ is greater than zero and the ratio:

$$f = \frac{x_{A1}^2 + y_{A1}^2}{Denom_4^2}$$

is greater than 0.01 and less than 100, then the estimate $\theta_{A1}$ is obtained using the relation:

$$\theta = \arctan(y_{a1}, x_{A1}).$$

Similar rules may be applied to generate rotation estimates $\theta_{B1}, \theta_{B1}, \theta_{B2}, \theta_{C1}$, and $\theta_{C2}$, generating up to six (6) rotation estimates. If there are only one (1) or two (2) estimates available then all estimates are selected and passed to the next stage of processing. Otherwise, the best rotation estimate may be selected by finding a cluster of angles that are close together and selecting a rotation in the middle of the cluster.

Processing then continues to step 1830 which selects the next rotation estimate from the set determined at step 1825.

Step 1840 then computes an offset estimate and a match score for the current set of estimated control parameter, scaling and rotation. Techniques exist for offset estimation and match score estimation. The offset estimate may be the difference in centroid between the skeleton set and the contours of the template shape with the appropriate control parameter, scaling and rotation applied. The match score may be based on an area or path comparison of the skeleton and the contours of the template shape and is generally a number that increases as the match improves. The match score may be normalised so that a match score of one (1) represents a perfect match.

Processing continues to step 1850 where the current match score is tested against the best match score. If the current match score is better than the best match score, or a match score has not yet been stored, then processing continues to step 1860. Step 1860 operates to store the match parameters (control parameter, scaling, rotation, and offset and line width if one was supplied, or assumed zero line width otherwise) and sets the best match score to the current match score, and then continues to step 1870. Otherwise, where the computer match score is not the best or first, processing continues directly to step 1870.

Step 1870 checks if there are more rotation estimates for the current control parameter and scaling estimate. If there are, then processing returns to step 1830, otherwise processing continues to step 1880. Step 1880 checks if there are more scaling estimates for the current control parameter estimate. If there are, then processing returns to step 1820, otherwise processing continues to step 1890. Step 1890 checks if there are more control parameter estimates. If there are, then processing returns to step 1810, otherwise processing of the method 1800 ends.

Figure 19:
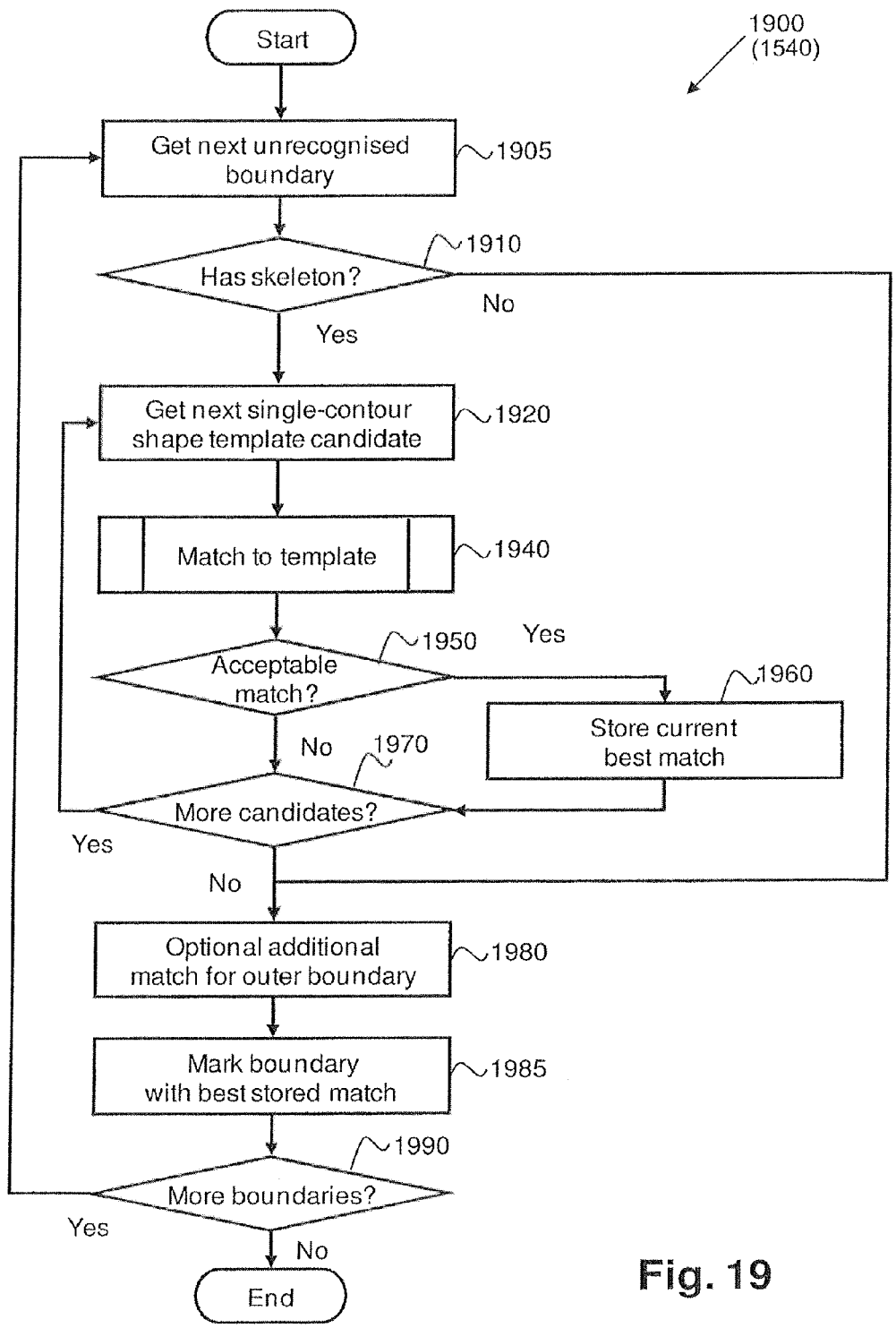
FIG. 19 is a flowchart showing the process of matching single contour template shapes to boundaries of an object.

The method 1900 of matching single contour template shapes as executed at step 1540, will now be described with reference to FIG. 19. The method 1900 uses a loop structure to process each of the unrecognised boundaries individually, starting at step 1905 which selects the next unrecognised boundary. Step 1910 then checks whether the boundary has a skeleton as computed at step 1515, and if it does then processing continues to step 1915, otherwise processing moves to step 1980.

A set of acceptable candidate single contour template shapes was generated for the skeleton at step 1520. These candidates are considered in turn starting at step 1920, which selects the next single contour template shape candidate. The skeleton is then matched to the candidate template at step 1940, which operates in accordance with the method 1800 that was described above in detail with reference to FIG. 18. A line width, determined as the average line width around the current boundary from the line statistics table as calculated in step 325 is also supplied at step 1940. Step 1950 determines whether an acceptable match has been found by comparison of the match score with a threshold and also comparing with the current best match. If the match score is better than the threshold (typically 0.95) and also better than any previously obtained match, then processing continues to step 1960 which stores the match and the set of parameters associated with it, including the average line width around the current boundary, and then to step 1970. Otherwise processing goes directly to step 1970. Step 1970 checks whether there are any more candidate templates. If there are, then processing returns to step 1940, otherwise processing continues to step 1980.

If the current boundary is an outer boundary of a graphical object, and the line statistics computed at step 1515 meet the criteria:

$$L_{side} < 0.9 L_{perim} \text{ and } L_{skel} < 0.75 L_{perim2}$$

then step 1980 performs an extra shape matching process on the boundary without compensation for line width, to determine if the entire object is a solid filled shape. The shape matching is achieved by determining a set of candidate template shapes, and looping through them storing the best match from all candidates that is better than a specified threshold, for example 0.95. If an acceptable best match is found for the unmodified outer boundary and it is better than the best match for the skeleton then it is stored in preference to the skeleton match.

Processing then continues to step 1985 which marks the boundary with the recognition result of the best accepted template match if one exists, then to 1990 which checks whether there are any more unrecognised boundaries to analyse. If there are any more boundaries then processing returns to step 1905, otherwise the method 1900 ends.

Figure 14:
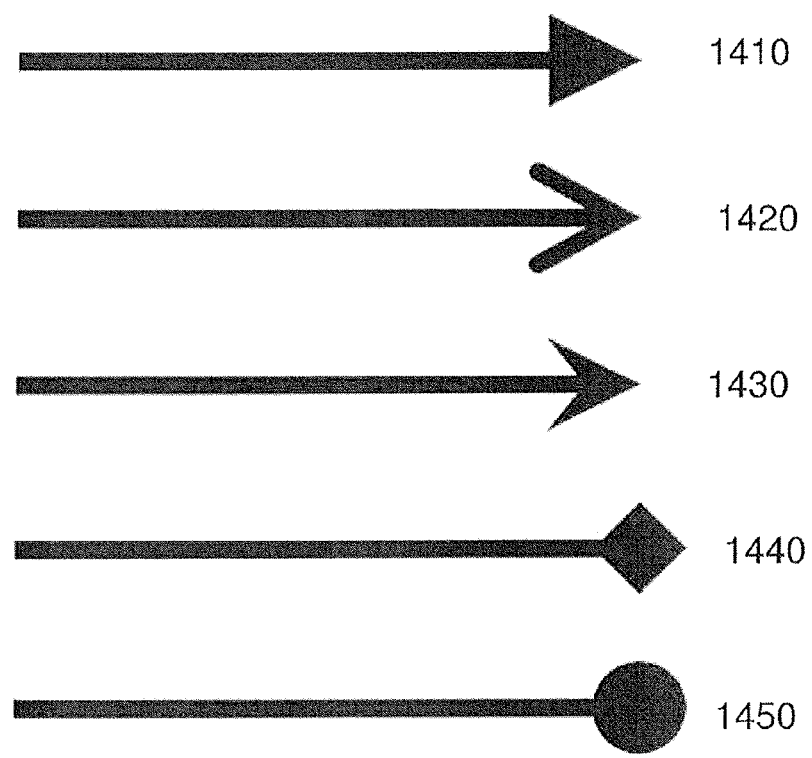
FIG. 14 shows a selection of Microsoft™ Office arrowhead styles.
Figure 20:
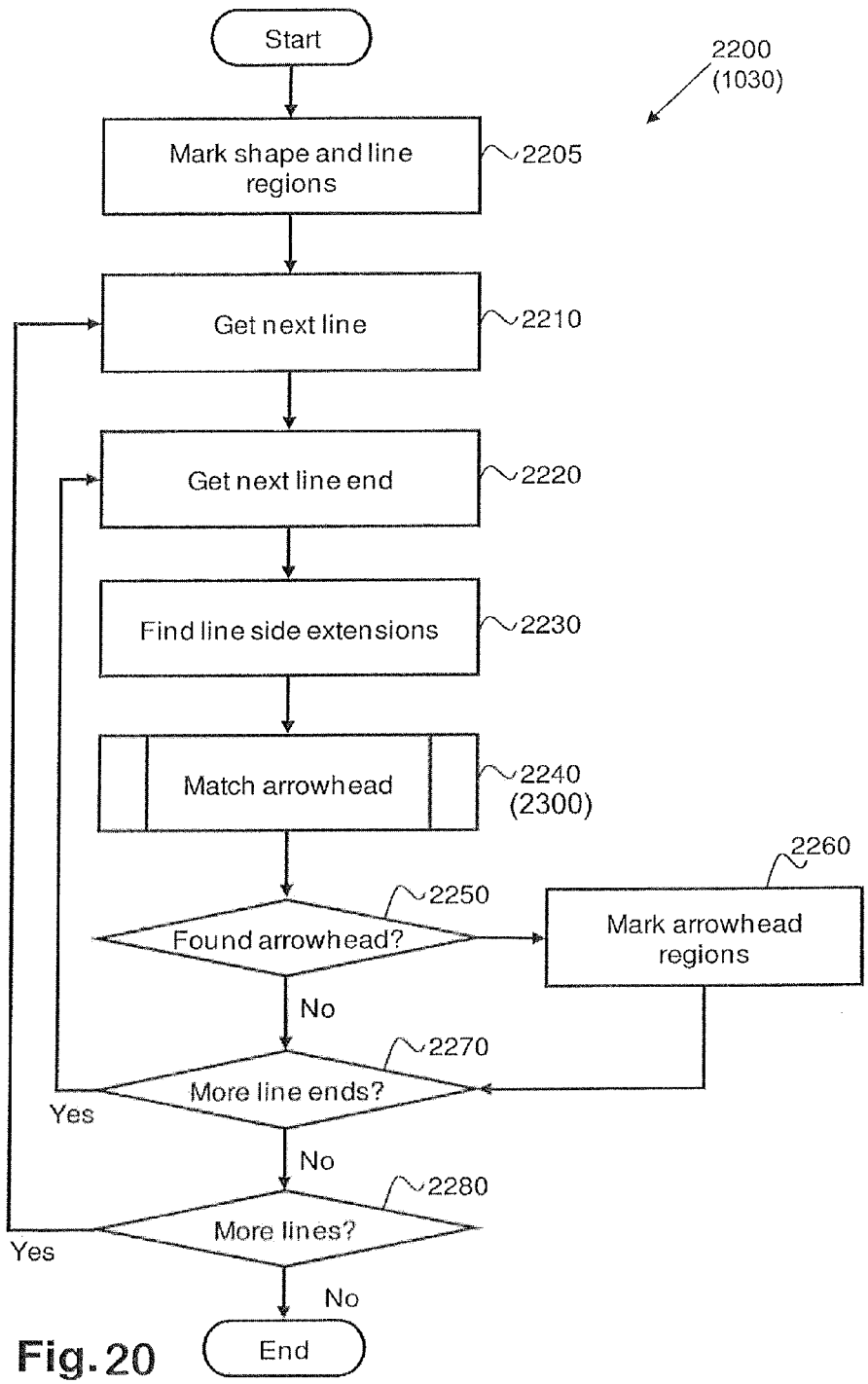
FIG. 20 is a flowchart showing the detection of arrowheads within the graphical object.

An exemplary method 2200 of detecting arrowheads, which may be executed at step 1030, will now be described with reference to FIG. 20. FIG. 14 illustrates a set of arrowhead styles that may be used in Microsoft Office™ applications. The arrowheads of FIG. 14 include a block arrowhead 1410, an open arrowhead 1420, a classic arrowhead 1430, a diamond arrowhead 1440 and an oval arrowhead 1450. The method described covers the recognition of the block arrowhead 1410, however it may be easily adapted to match the other arrowheads.

The method 2200 begins at step 2205 which marks all regions that are included in matches to lines or matched template shapes. The method of testing whether a region is included in a matched shape described in step 1020 may be used for this purpose. The triangles of the example triangulation of FIG. 13(c) that are included in a line element are shaded black in FIG. 13(d), while those included in a shape are shaded black in FIG. 13(e). If the method 2200 is to be adapted to match open arrowheads, such as the arrowhead 1420 of FIG. 14, then some small lines that may be part of such an arrowhead are not marked at this stage.

Next, a loop structure is used to detect arrowheads at each end of each of the detected lines. At step 2210, the next line is selected, and then at step 2220 the next unprocessed end (i.e. front or back) of the selected line is also selected. Step 2230, creates boundary extensions for each side of the line section starting at the end points on each side of the line and following the boundary extending away from the line. The two side extensions will be referred to as side A and side B. The extensions end wherever the next section is on the boundary of a marked region (i.e. one which is in a recognised shape, line element or arrowhead), if the length of the boundary extension becomes large compared to the line width or if the two extensions meet. FIG. 13(f) illustrates the line extension forming process. A line element, corresponding to the element 1334 of FIG. 13(d), is detected between the two shapes which end at the points 1351 and 1352, being the intersections between the horizontal wire-frame lines in FIG. 13(f) representing the line element 1334 and the vertical left side of the triangular arrowhead). On the first side the line extension covers the section from the end point 1351 to a point 1353 (on one side of the apex of the arrowhead), while on the second side the line extension covers the section from the end point 1532 to a point 1534 (on the other side of the apex of the arrowhead). The line extensions define a region 1355, marked in black, as a first potential arrowhead. A second region 1356 corresponding to a second potential arrowhead is also shown.

Figure 21:
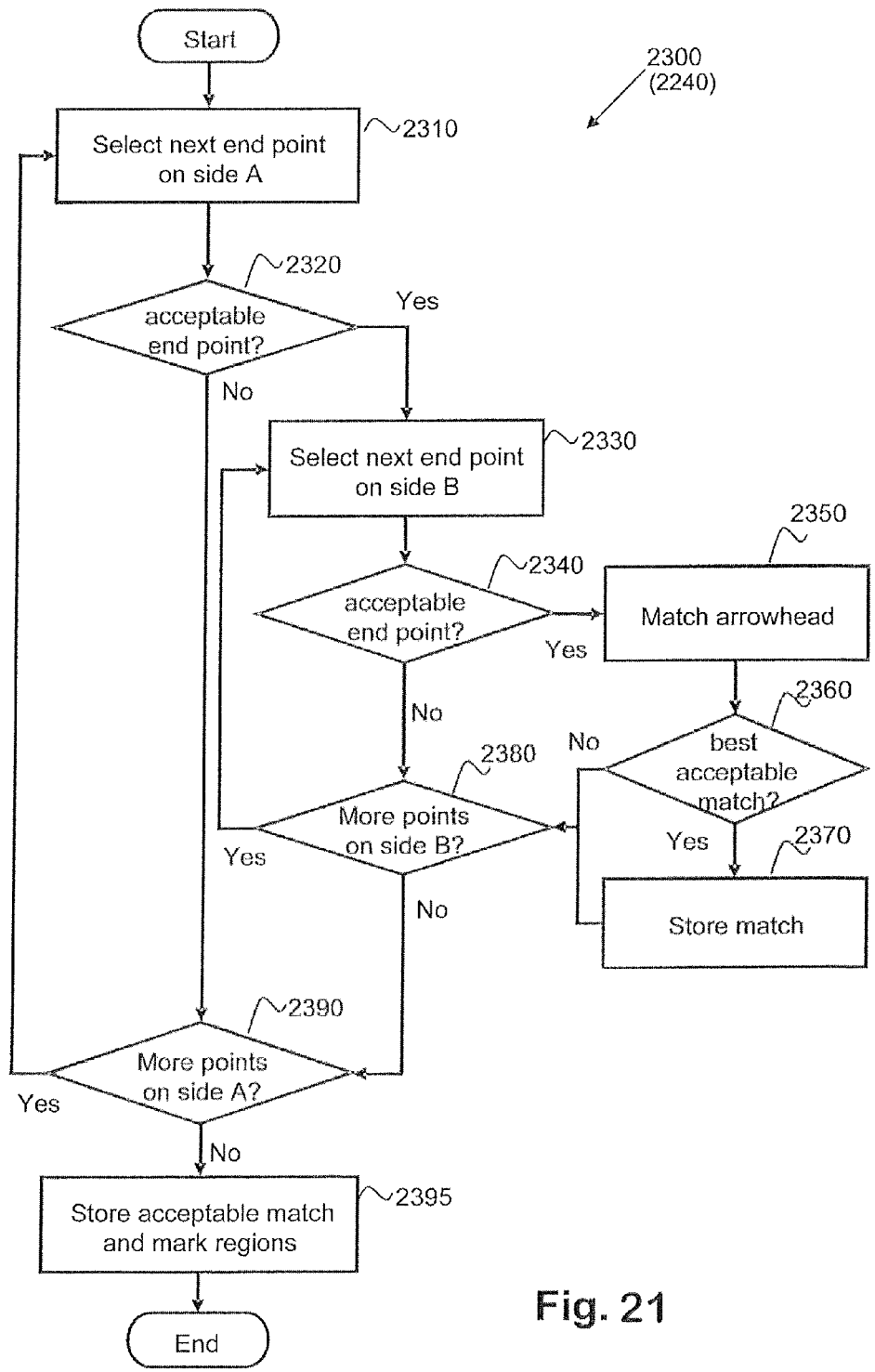
FIG. 21 is a flowchart showing the detection of an arrowhead associated with the end of a specified line element.

Processing then continues to step 2240 which matches one or more arrowhead shapes to the line extensions in accordance with a preferred method 2300 which will be described below with reference to FIG. 21. Step 2250 then checks whether an arrowhead was detected, and if so then processing continues to step 2260, where the arrowhead parameters and style are stored with the current line and the regions associated with the arrowhead are marked, and then to step 2270. Otherwise, where no arrowhead is detected in step 2250, processing continues directly to step 2270.

At step 2270, if a single end of the line has been analysed then processing returns to step 2220, otherwise processing continues to step 2280. Step 2280 checks whether there are more lines to be processed. If there are, then processing returns to step 2210, otherwise the processing of the method 2200 ends.

The method 2300 of matching arrowheads from line extensions as executed at step 2240, will now be described with reference to FIG. 21. The method 2300 uses a double loop structure through each of the line extensions to find the best arrowhead match.

Step 2310 selects the next point on the first line extension, referred to as side A, starting at the second point. Returning to FIG. 13(*f*) for example, the first point on side A is the point 1351 and the second point would be that vertically above the point 1351 at the "top" of the black triangle. Step 2320 then tests the point to determine whether it is acceptable. The point may be taken to be acceptable if the distance along the line extension is between one and fifteen times the average width of the line. If the point is not acceptable then processing continues to step 2390, otherwise processing continues to step 2330 which selects the next point on the other line extension, referred to as side B, again starting with the second point. The second point here is that vertically below the point 1352 at the "bottom" of the black triangle. Step 2340 then tests whether this is an acceptable line end. The point may be tested using the same criteria as for side A. Additionally a test for further acceptability may be made in step 2340 to check whether the line between the points on side A and B is inside a single graphical object and does not intersect any boundaries. If the point is not acceptable then processing continues to step 2380, otherwise processing proceeds to step 2350.

Step 2350 performs an arrowhead match for a test object. The test object is formed by appending the reversed side B section that has been selected (i.e. from the current end point back to the first point on side B) to the side A section (i.e. from the start of side A to the current selected point). Various methods may be used to match arrowheads, many of which make use of shape recognition techniques such as those described in this disclosure. The block arrowhead can be detected by matching to a triangle shape, where the match rotation may be constrained according to the orientation of the last line segment at the line end currently being analysed. Alternatively, a match to a template shape such as the trapezoid shape (e.g. 16008 in FIG. 16(*a*)) may be used where a control parameter of the trapezoid shape template may be used as an additional rejection parameter (for example only a trapezoid for which the lower edge length is less than a quarter of the upper trapezoid edge may be accepted). Similar arrowhead detection methods are suitable for the other arrowhead shapes.

A match score from the shape recognition is passed to the step 2360 which determines whether the match is sufficiently high to be accepted. In a preferred implementation a threshold may be selected based on the scale parameters of the match, and this threshold may be low for small arrowheads. If acceptable, step 2360 determines if the match is a higher match than the current best match. If both conditions are met then processing continues to step 2370 which stores the match and the set of points from the line extensions that contribute to the match, then continues to step 2380. Otherwise processing continues directly to step 2380.

At step 2380, the processor 1105 determines whether there are more points on side B to consider. If there are, then processing returns to step 2330, otherwise processing continues to step 2390. Next, at step 2390 the processor 1105 determines whether there are more points on side A to consider. If there are then processing returns to step 2320, otherwise processing continues to step 2395.

If there is an acceptable match, then step 2395 stores the match in association with the current line end and also marks the relevant regions in the arrowhead as part of the detected arrowhead, completing the processing of step 2300.

INDUSTRIAL APPLICABILITY

The arrangements described are applicable to the computer and data processing industries and particularly for the processing of images for fast line linking.

The foregoing describes only some embodiments of the present invention, and modifications and/or changes can be made thereto without departing from the scope and spirit of the invention, the embodiments being illustrative and not restrictive.

APPENDIX A

TABLE 1

| SHAPE NAME | REFERENCE |
| --- | --- |
| Rectangle | 16001 |
| Round Rectangle | 16002 |
| Ellipse | 16003 |
| Diamond | 16004 |
| Isosceles Triangle | 16005 |
| Right Triangle | 16006 |
| Parallelogram | 16007 |
| Trapezoid | 16008 |
| Hexagon | 16009 |
| Octagon | 16010 |
| Plus Sign | 16011 |
| Star | 16012 |
| Arrow | 16013 |
| Thick Arrow | 16014 |
| Home Plate | 16015 |
| Balloon | 16016 |
| Seal | 16017 |
| Plaque | 16018 |
| Chevron | 16019 |
| Pentagon | 16020 |
| Seal8 | 16021 |
| Seal16 | 16022 |
| Seal32 | 16023 |
| Wedge Rectangle Callout | 16024 |
| Wedge Rrect Callout | 16025 |
| Wedge Ellipse Callout | 16026 |
| Wave | 16027 |
| Left Arrow | 16028 |
| Down Arrow | 16029 |
| Up Arrow | 16030 |
| Left Right Arrow | 16031 |
| Up Down Arrow | 16032 |
| Irregularseal1 | 16033 |
| Irregularseal2 | 16034 |
| Lightning Bolt | 16035 |
| Heart | 16036 |
| Quad Arrow | 16037 |
| Left Arrow Callout | 16038 |
| Right Arrow Callout | 16039 |
| Up Arrow Callout | 16040 |
| Down Arrow Callout | 16041 |
| Left Right Arrow Callout | 16042 |
| Up Down Arrow Callout | 16043 |

TABLE 1-continued

| SHAPE NAME | REFERENCE |
| --- | --- |
| Quad Arrow Callout | 16044 |
| Left Up Arrow | 16045 |
| Bent Up Arrow | 16046 |
| Bent Arrow | 16047 |
| Seal24 | 16048 |
| Notched Right Arrow | 16049 |
| Block Arc | 16050 |
| Circular Arrow | 16051 |
| U Turn Arrow | 16052 |
| Flow Chart Process | 16053 |
| Flow Chart Decision | 16054 |
| Flow Chart Input Output | 16055 |
| Flow Chart Document | 16056 |
| Flow Chart Terminator | 16057 |
| Flow Chart Preparation | 16058 |
| Flow Chart Manual Input | 16059 |
| Flow Chart Manual Operation | 16060 |
| Flow Chart Connector | 16061 |
| Flow Chart Punched Card | 16062 |
| Flow Chart Punched Tape | 16063 |
| Flow Chart Extract | 16064 |
| Flow Chart Merge | 16065 |
| Flow Chart Online Storage | 16066 |
| Flow Chart Magnetic Tape | 16067 |
| Flow Chart Display | 16068 |
| Flow Chart Delay | 16069 |
| Flow Chart Alternate Process | 16070 |
| Flow Chart Off Page Connector | 16071 |
| Left Right Up Arrow | 16072 |
| Moon | 16073 |
| Seal4 | 16074 |
| Double Wave | 16075 |
| Cube | 16076 |
| Can | 16077 |
| Donut | 16078 |
| Ribbon | 16079 |
| Ribbon2 | 16080 |
| No Smoking | 16081 |
| Folded Corner | 16082 |
| Bevel | 16083 |
| Striped Right Arrow | 16084 |
| Vertical Scroll | 16085 |
| Horizontal Scroll | 16086 |
| Curved Right Arrow | 16087 |
| Curved Left Arrow | 16088 |
| Curved Up Arrow | 16089 |
| Curved Down Arrow | 16090 |
| Cloud Callout | 16091 |
| Ellipse Ribbon | 16092 |
| Ellipse Ribbon 2 | 16093 |
| Flow Chart Predefined Process | 16094 |
| Flow Chart Internal Storage | 16095 |
| Flow Chart Multidocument | 16096 |
| Flow Chart Summing Junction | 16097 |
| Flow Chart Or | 16098 |
| Flow Chart Collate | 16099 |
| Flow Chart Sort | 16100 |
| Flow Chart Offline Storage | 16101 |
| Flow Chart Magnetic Disk | 16102 |
| Flow Chart Magnetic Drum | 16103 |
| Sun | 16104 |

I claim:

1. A computer implemented method of processing a bitmap image including at least one shape defined by at least one line, the method comprising:

processing the image to form a plurality of boundaries, each said boundary representing an enclosed path, the plurality of boundaries defining at least one enclosed region representing a graphical object;

detecting line elements and associated regions in the graphical object;

determining line statistics corresponding to at least one of the boundaries of the object based on the detected line elements, the line statistics including a line length parameter based on the combined length of line elements corresponding to said at least one boundary;

performing shape recognition on at least one of the boundaries based on said line statistics; and recognising at least one part of the object as a shape and storing a description of the shape.

2. The method according to claim 1 further comprising:
decomposing the object into a number of parts based on the recognised shape.

3. The method according to claim 1 where the recognised shape is a multi-contour shape.

4. The method according to claim 1 wherein the object has overlapping line components, the method further comprising:
forming a set of line connections between the line elements, wherein the boundaries of the object are formed based on the line connections and at least one part of the object is recognised as an overlapping or overlapped shape.

5. A method according to claim 1, comprising:
forming a set of line connections between the line elements;
forming a set of alternative boundaries that define the object based on the line connections;
computing line statistics corresponding to the set of alternative boundaries of the object based on the detected line elements;
performing shape recognition on the set of alternative boundaries based on said line statistics; and
recognising at least one part of the object as an overlapping or overlapped shape.

6. The method according to claim 5 further comprising the step of:
decomposing the object into a number of parts based on the recognised shapes.

7. The method according to claim 5, wherein forming the set of alternative boundaries comprises:
adding a point on a boundary of the object to the alternative boundary;
selecting a next point on the boundary to add to the alternative boundary wherein the next point is determined by following the boundary;
adding a line connection from the set of line connections to the alternative boundary if the next point matches the line connection; and
repeating said selecting and adding until the alternative boundary is closed.

8. The method according to claim 7, further comprising:
terminating said repeating if said next point has already been added to the alternative boundary.

9. The method according to claim 8, wherein any of the points added to the alternative boundary are discarded if they are outside a closed boundary formed by said points, the closed boundary being having one of the points as a start and end point.

10. A method according to claim 1 in which arrowhead shapes are recognised, the method comprising:
detecting regions matched to line elements or template shapes;
processing the detected line elements to identify line extensions following a boundary of a region associated with and extending away from the detected line elements;
matching the identified line extensions with an arrowhead shape; and
storing a matched arrowhead shape associated with the regions.

11. A method according to claim 10 wherein the matching comprises:

examining the line extensions on either side of the line element to identify end points thereof;

testing if the end point is acceptable for each side; and forming a test object from the line extensions and the identified end points and matching the test object with an arrowhead shape.

12. A method according to claim 11 wherein the matching of the test object comprises assessing a best acceptable match with a template shape and storing the best match.

13. A non-transitory computer readable storage medium having a program recorded thereon, the program being executable by computer apparatus to process a bitmap image including at least one shape defined by at least one line, the program comprising:

code for processing the image to form a plurality of boundaries, each said boundary representing an enclosed path, the plurality of boundaries defining at least one enclosed region representing a graphical object;

code for detecting line elements and associated regions in the graphical object;

code for determining line statistics corresponding to at least one of the boundaries of the object based on the detected line elements, the line statistics including a line length parameter based on the combined length of line elements corresponding to said at least one boundary;

code for performing shape recognition on at least one of the boundaries based on said line statistics; and code for recognising at least one part of the object as a shape and storing a description of the shape.

14. Computer apparatus for processing a bitmap image including at least one shape defined by at least one line, the apparatus comprising:

an input for receiving a bitmap image of a document;

a memory for storing the bitmap image;

a processor coupled to the memory, the processor being configured to:

process the image to form a plurality of boundaries, each said boundary representing an enclosed path, the plurality of boundaries defining at least one enclosed region representing a graphical object;

detecting line elements and associated regions in the graphical object;

determining line statistics corresponding to at least one of the boundaries of the object based on the detected line elements, the line statistics including a line length parameter based on the combined length of line elements corresponding to said at least one boundary;

perform shape recognition on at least one of the boundaries based on said line statistics;

recognising at least one part of the object as a shape; and to store a description of the shape in the memory.

\* \* \* \* \*